(12) United States Patent
Katsuragi et al.

(10) Patent No.: US 6,550,903 B2
(45) Date of Patent: Apr. 22, 2003

(54) LIQUID COMPOSITION, INK SET FOR INK-JET RECORDING, INK-JET RECORDING PROCESS, RECORDING UNIT AND INK-JET RECORDING APPARATUS

(75) Inventors: Ryuji Katsuragi, Tokyo (JP); Makoto Shioya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 09/784,056

(22) Filed: Feb. 16, 2001

(65) Prior Publication Data

US 2001/0030678 A1 Oct. 18, 2001

(30) Foreign Application Priority Data

Feb. 17, 2000 (JP) ........................ 2000-045073
Feb. 17, 2000 (JP) ........................ 2000-045074

(51) Int. Cl.$^7$ ................................ B41J 2/17
(52) U.S. Cl. .................... 347/96; 106/31.58; 106/31.86
(58) Field of Search ............................ 347/96, 98, 101, 347/100; 106/31.27, 31.6, 31.13, 31.58, 31.86

(56) References Cited

U.S. PATENT DOCUMENTS

| 4,732,613 A | 3/1988 | Shioya et al. ................. 106/20 |
| 5,198,023 A | 3/1993 | Stoffel ............................ 106/22 |
| 5,428,383 A | 6/1995 | Shields et al. ................. 347/96 |
| 5,609,671 A | 3/1997 | Nagasawa ..................... 106/20 R |
| 6,086,197 A * | 7/2000 | Kubota et al. ................. 347/96 |
| 6,176,913 B1 | 1/2001 | Kasperchik et al. ..... 106/31.48 |

FOREIGN PATENT DOCUMENTS

| EP | 0 534 634 A1 | 3/1993 |
| EP | 0 586 079 A1 | 3/1994 |
| JP | 5-186704 A | 7/1993 |
| JP | 5-202328 A | 8/1993 |
| JP | 6-106841 A | 4/1994 |
| JP | 8-003498 A | 1/1996 |
| JP | 2000-136337 A | 5/2000 |
| WO | WO 00/37574 | 6/2000 |

* cited by examiner

Primary Examiner—John Barlow
Assistant Examiner—Michael S Brooke
(74) Attorney, Agent, or Firm—Fitzpatrick, Cella, Harper & Scinto

(57) ABSTRACT

The invention provides liquid compositions, ink sets for ink-jet recording, ink-jet recording processes, recording units and ink-jet recording apparatus for providing high-quality images with lessened bleeding. The invention also provides liquid compositions, ink sets for ink-jet recording, ink-jet recording processes, recording units and ink-jet recording apparatus for providing images excellent in water fastness.

A first liquid containing a polyvalent metal salt of aldonic acid and a second liquid containing a coloring material capable of reacting with the polyvalent metal salt are used in combination and applied on a recording medium so as to come into contact with each other, thereby conducting recording.

35 Claims, 8 Drawing Sheets

LIQUID COMPOSITION, INK SET FOR INK-JET RECORDING, INK-JET RECORDING PROCESS, RECORDING UNIT AND INK-JET RECORDING APPARATUS

BACKGROUND OF THE INVENTION

1. Field of the Invention

The present invention relates to a liquid composition, an ink set for ink-jet recording, an ink-jet recording process, a recording unit and an ink-jet recording apparatus, and more particularly to a liquid composition and an ink set for ink-jet recording, which can form images with decreased bleeding and excellent water fastness, and an ink-jet recording process, a recording unit and an ink-jet recording apparatus using either one of these composition and ink set.

2. Related Background Art

An ink-jet recording method is a recording method of low noise and nonimpact in which an ink is directly ejected on a recording medium to record an image. This method is easy to reduce running cost, miniaturize an apparatus and form color images because no complicated apparatus is required upon practice thereof. Therefore, recording apparatus such as printers, copying machines, facsimiles and word processors, to which the ink-jet recording method is applied, have heretofore been put into practical use. A color ink-jet recording apparatus have also been put into practical use for forming multi-color images with a black ink and color ink(s) (for example, at least one color ink selected from yellow, cyan, magenta, red, green and blue inks) using such an ink-jet recording technique.

On the other hand, image formation by the ink-jet recording method involves a problem that there occurs a phenomenon (bleeding) that when two inks of different kinds are applied adjoiningly on a recording medium, the inks are mixed with each other at boundaries between them to deteriorate the quality of a color image formed. In particular, color mixing at boundaries between a black ink and a color ink greatly affects deterioration of image quality, so that various solving methods have been developed.

A representative solving method is an ink set and a recording method having a mechanism that when two inks are applied adjoiningly on a recording medium, viscosity increase of at least one ink or aggregation or precipitation of at least one ink is caused to prevent bleeding.

As described in, for example, Japanese Patent Application Laid-Open No. 5-202328, U.S. Pat. No. 5,198,023 and Japanese Patent Application Laid-Open No. 6-106841, there are disclosed techniques for controlling color bleeding by using a first liquid containing a precipitant and a second liquid containing a coloring material capable of forming precipitate by the precipitant in combination. Polyvalent metal salts are disclosed as the precipitant, and dyes having at least one carboxyl group, and the like are disclosed as the coloring materials capable of precipitating by the polyvalent metal salts. The first liquid may contain a coloring material. In this case, the first liquid may also be used as an ink. However, all these polyvalent metal salts use a $Cl^-$, $NO_3^-$, $I^-$, $Br^-$, $ClO_3^-$ or $CH_3COO^-$ ion as an anion in the polyvalent metal salts. Further, Japanese Patent Application Laid-Open No. 2000-136337 discloses, as precipitants, metal-coordinated compounds with a polyvalent metal ion coordinated to a compound having a ligand, such as lactic acid, in addition to the above-described polyvalent metal salts.

SUMMARY OF THE INVENTION

The present inventors have carried out an extensive investigation with a view toward improving bleeding. As a result, it has been found that when a first liquid containing a polyvalent metal salt of aldonic acid and a second liquid containing a coloring material capable of reacting with the polyvalent metal salt of aldonic acid are used in combination, and when these liquids are applied onto a recording medium so as to form a contact state, the coloring material reacts with the polyvalent metal ion to lessen occurrence of bleeding. The term "reaction" as used in the present invention means to cause aggregation, precipitation or viscosity increase of the second liquid and also includes a reaction after these liquids penetrate into the recording medium. It has further found that polyvalent metal salts of aldonic acid are excellent in solubility in an ink, can be effectively utilized as a component of the ink and is very safe against the human body. It has also been confirmed that improvement in water fastness is observed when the first liquid and second liquid are applied so as to overlap each other.

It is therefore an object of the present invention to provide a liquid composition which can alleviate occurrence of bleeding when used in an ink-jet recording method together with an color ink and can form high-quality images improved in water fastness.

Another object of the present invention is to provide an ink set which permits the formation of high-quality images with lessened occurrence of bleeding and having excellent water fastness.

A further object of the present invention is to provide an ink-jet recording process which can form images having good water fastness.

A still further object of the present invention is to provide an ink-jet recording process which can form color images in which bleeding at boundaries between adjacent inks of different colors is alleviated.

A yet still further object of the present invention is to provide an ink-jet recording apparatus which can be suitably used for the formation of color images having lessened occurrence of bleeding and images having good water fastness.

A yet still further object of the present invention is to provide a recording unit which can be suitably used in the ink-jet recording apparatus.

The above objects can be achieved by the present invention described below.

According to an embodiment of the present invention, there is thus provided a liquid composition for an ink jet recording which is used together with a color ink and reacts with the color ink when it comes into contact with the color ink, which comprises a polyvalent metal salt of aldonic acid and a liquid medium.

According to an embodiment of the present invention, there is also provided an ink-jet recording process, comprising the steps of:
 (i) applying energy to the liquid composition described above to eject it toward a recording medium;
 (ii) applying energy to a color ink to eject it toward a recording medium; and
 (iii) forming a contact state of the liquid composition with the color ink on the recording medium.

According to an embodiment of the present invention, there is further provided an ink set for ink-jet recording, comprising
 (1) the liquid composition described above, and
 (2) a color ink which comprises a coloring material and a liquid medium and reacts with the liquid composition by in contact with the liquid composition.

According to an embodiment of the present invention, there is still further provided a recording unit, comprising a liquid composition container portion containing the liquid composition described above, an ink container portion containing a color ink, and an ink-jet recording head for ejecting the liquid composition and the color ink by applying energy to the liquid composition and the color ink.

According to an embodiment of the present invention, there is yet still further provided an ink-jet recording apparatus, comprising a liquid composition container portion containing a liquid composition, an ink container portion containing a color ink, and an ink-jet recording head for ejecting the liquid composition and the color ink by applying energy to the liquid composition and the color ink, wherein the liquid composition is the liquid composition described above.

According to another embodiment of the present invention, there is yet still further provided an ink-jet recording apparatus comprising the recording unit described above.

According to another embodiment of the present invention, there is yet still further provided an ink set for ink-jet recording, comprising
(1) a color ink comprising a coloring material, a liquid medium and a polyvalent metal salt of aldonic acid, and
(2) a black ink which comprises a coloring material and a liquid medium and reacts with the color ink by contact with the color ink.

According to another embodiment of the present invention, there is yet still further provided an ink-jet recording process, comprising the steps of:
(i) applying energy to the black ink contained in the ink set described above to eject it toward a recording medium;
(ii) applying energy to the color ink contained in the ink set described above to eject it toward a recording medium; and
(iii) forming a contact state of the black ink with the color ink on the recording medium.

According to another embodiment of the present invention, there is yet still further provided a recording unit, comprising an ink container portion containing the ink set described above and an ink-jet recording head for ejecting the inks being fed from the ink container portion by applying energy to the inks.

According to another embodiment of the present invention, there is yet still further provided an ink-jet recording apparatus, comprising an ink container portion containing an ink set comprising at least a black ink and a color ink and an ink-jet recording head for ejecting the ink being fed from the ink container portion by applying energy to the ink, wherein the ink set is the ink set described above.

According to a further embodiment of the present invention, there is yet still further provided an ink-jet recording apparatus comprising the recording unit described above.

DESCRIPTION OF THE PREFERRED EMBODIMENTS

Figure 1:
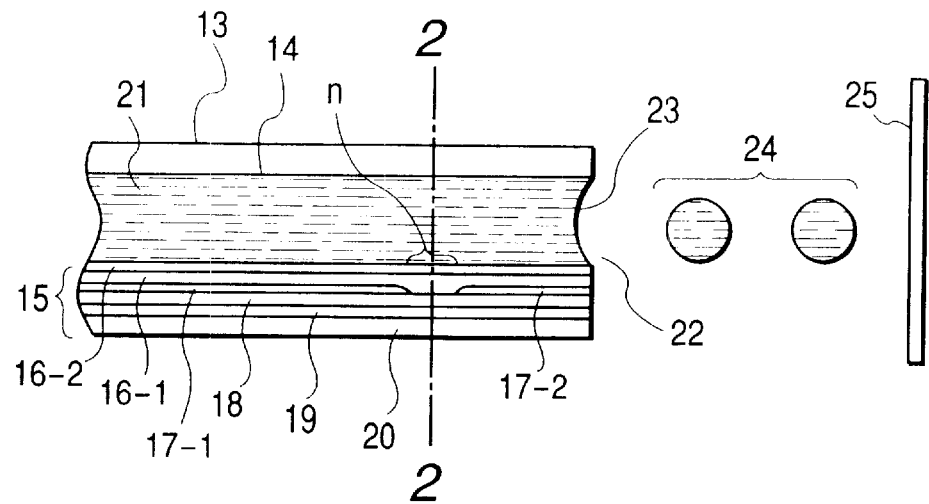
FIG. 1 is a longitudinal cross-sectional view illustrating an exemplary head of an ink-jet recording apparatus.

The present invention will be described in more detail by the preferred embodiments.

First Embodiment

Firstly, is described a specific embodiment of the present invention, in which a liquid composition comprising a polyvalent metal salt of aldonic acid and a color ink comprising a coloring material are used in combination. In this embodiment, the polyvalent-metal-salt-containing liquid composition which causes a reaction by contact with the coloring material in the color ink to cause aggregation, precipitation or viscosity increase of the color ink and the color ink are applied onto a recording medium so as to bring them into contact with each other, thereby conducting recording. The liquid composition does preferably not affect the color tone of the color ink in a recorded image.

Aldonic acid contained in the liquid composition according to this embodiment will hereinafter be described in detail.

Aldonic acid is a polyhydroxycarboxylic acid corresponding to a compound obtained by oxidizing an aldehyde group of aldose into a carboxyl group and represented by the general formula

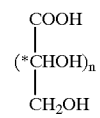

wherein n is an integer of 0 or higher, and *C denotes an asymmetric carbon atom.

Since aldonic acid has an asymmetric carbon atom as described above, many optical isomers are present. It is generally said that any aldonic acid having at least 5 carbon atoms (n being at least 3 in the general formula) is rarely present in an aqueous solution by itself, and a part of aldonic acid forms a lactone with a hydroxyl group located at a γ position or δ position to become γ-aldonolactone or δ-aldonolactone respectively, and so aldonic acid is present in the form of an equilibrium mixture of aldonic acid, γ-aldonolactone and δ-aldonolactone.

Aldonic acid is classified by the number of carbon atoms, and that having 4 carbon atoms (n being 2 in the general formula) is generically named as tetronic acid; that having 5 carbon atoms (n being 3 in the general formula) as pentonic acid; and that having 6 carbon atoms (n being 4 in the general formula) as hexonic acid. Specific examples of aldonic acid include glycolic acid (another name: hydroxyacetic acid) having 2 carbon atoms (n being 0 in the general formula); glyceric acid having 3 carbon atoms (n being 1 in the general formula); erythronic acid and threonic acid having 4 carbon atoms (n being 2 in the general formula); ribonic acid, arabonic acid, xylonic acid and lyxonic acid having 5 carbon atoms (n being 3 in the general formula); gluconic acid, allonic acid, altronic acid, mannonic acid, gulonic acid, idonic acid, galactonic acid and talonic acid having 6 carbon atoms (n being 4 in the general formula); and glucoheptonic acid having 7 carbon atoms (n being 5 in the general formula). In these compounds, D-forms, L-forms and DL-form may be present in some cases.

Gluconic acid (n being 4 in the general formula) which is preferably used in this embodiment and particularly preferred among aldonic acids will hereinafter be described. Gluconic acid is widely used as an additive for food and is safe for the human body. It is generally said that gluconic acid is rarely present in an aqueous solution by itself, and a part of aldonic acid forms a lactone with a hydroxyl group located at the γ position or δ position to become γ-gluconolactone or δ-gluconolactone respectively, and so gluconic acid is present in the form of an equilibrium mixture of gluconic acid, γ-gluconolactone and δ-gluconolactone. In gluconic acid, a D-form, L-form and DL-form are present, any of them may be used. However, D-gluconic acid of the D-form is generally available with ease. As optical isomers of gluconic acid, allonic acid, altronic acid, mannonic acid, gulonic acid, idonic acid, galactonic acid and talonic acid are present. These compounds may also be used because they have nature similar to gluconic acid.

For the present invention, a polyvalent metal salt of gluconic acid is preferably used. Particularly preferable examples thereof include magnesium gluconate, calcium gluconate, barium gluconate, iron(II) gluconate, copper(II) gluconate and zinc gluconate. Among these, magnesium gluconate and calcium gluconate are particularly preferably used. These compounds may be used in any combination thereof, to say nothing of single use thereof.

The total content of at least one compound selected from such polyvalent metal salts of aldonic acid as mentioned above is preferably 0.005 to 20% by mass, more preferably 0.05 to 12% by mass based on the total amount of the liquid composition for the purpose of achieving a higher effect to lessen bleeding and good ejection stability.

A color ink used together with the liquid composition according to this embodiment will hereinafter be described. The color ink comprises a coloring material and a liquid medium. The ink is such that it reacts with the polyvalent metal salt of aldonic acid on contact with the liquid composition containing the polyvalent metal salt to cause aggregation or precipitation of the coloring material in the color ink, or viscosity increase of the color ink. Examples of the coloring material include dyes and pigments.

As the pigments, almost all pigments such as inorganic pigments and organic pigments may be used.

Specific example thereof include:

Carbon Black;

C.I. Pigment Yellow 1, 2, 3, 12, 13, 14, 16, 17, 73, 74, 75, 83, 93, 95, 97, 98, 114, 128, 129, 151, 154 and 195;

C.I. Pigment Red 5, 7, 12, 48(Ca), 48(Mn), 57(Ca), 57:1, 57(Sr), 112, 122, 123, 168, 184 and 202;

C.I. Pigment Blue 1, 2, 3, 15:3, 15:34, 16, 22 and 60; and

C.I. Vat Blue 4 and 6.

When such a pigment as described above is used as a coloring material for ink, a dispersing agent is preferably used in combination therewith for the purpose of stably dispersing the pigment in the ink. As the dispersing agent, is used a polymeric dispersing agent or a surfactant type dispersing agent.

Specific examples of the polymeric dispersing agent include polyacrylates, salts of styrene-acrylic acid copolymers, salts of styrene-acrylic acid-acrylate terpolymers, salts of styrene-maleic acid copolymers, salts of acrylate-maleic acid copolymers, salts of styrene-methacrylsulfonic acid copolymers, salts of vinylnaphthalene-maleic acid copolymers, salts of β-naphthalene sulfonic acid-formalin polycondensates, polyvinyl pyrrolidone, polyethylene glycol and polyvinyl alcohol. Of these, those having a weight average molecular weight ranging from 1,000 to 30,000 and an acid value of 100 to 430 are preferred.

Examples of the surfactant type dispersing agent include laurylbenzenesulfonates, laurylsulfonates, laurylbenzenecarboxylates, laurylnaphthalenesulfonates, aliphatic amine salts and polyethylene oxide condensates. Any of these surfactants may be used. These dispersing agents may preferably be use in an amount ranging from 10:5 to 10:0.5 in terms of a ratio of the mass of the pigment to the mass of the dispersing agent used.

In this embodiment, such a carbon black pigment capable of self-dispersing by introducing a water-soluble group onto the surface of carbon black as described in, for example, Japanese Patent Application Laid-Open Nos. 5-186704 and 8-3498 may also be used as the coloring material. When such self-dispersing carbon black is used, such a dispersing agent as described above may not be necessarily used. Therefore, at least the amount of the dispersing agent used can remarkably be reduced.

When such a pigment ink as described above comes into contact with the liquid composition, the dispersion stability of the pigment in the pigment ink is broken by the salting-out effect and the like of the polyvalent metal ion in the liquid composition, and the dispersed state of the pigment is unstabilized. As a result, the pigment in the pigment ink promptly aggregates and precipitates to accelerate the fixing of the coloring material in the pigment ink to a recording medium. It is therefore considered that when at least two inks of different colors are applied adjoiningly on a recording medium, bleeding is hard to occur. In this embodiment, the unstabilization of the dispersed state of the pigment based on such effect as described above is regarded as "reaction" between the color ink and the liquid composition.

When a dye is used as the coloring material for the color ink according to this embodiment, a water-soluble dye is preferably used. As the water-soluble dye, may be used all dyes such as direct dyes, acid dyes, basic dyes and disperse dyes. As the color ink containing a dye as the coloring material, is preferably used an ink in which fixing of the dye in the color ink to a recording medium is promptly accelerated by deposition of the dye due to the salting-out effect, formation of a slightly water-soluble or water-insoluble salt or compound by a reaction of a divalent metal ion with the dye, or the combination of these effects by contact of the ink with the liquid composition according to this embodiment. As the dye usable in such a color ink, is preferred a dye having at least one carboxyl group because it is easy to react with the polyvalent metal salt of aldonic acid on contact with the polyvalent metal salt-containing liquid composition according to this embodiment to form an insoluble salt or compound. Specifically, dyes having such a structure as mentioned as Exemplary Compounds 1 to 30 below are preferably used. However, the present invention is not limited to these dyes.

Exemplary Compound 1

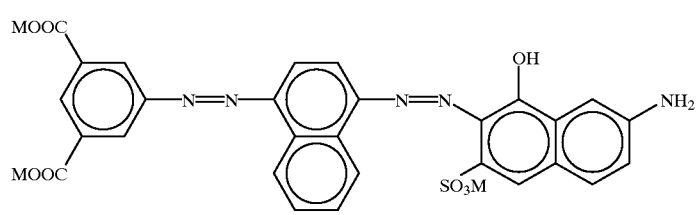

Exemplary Compound 2

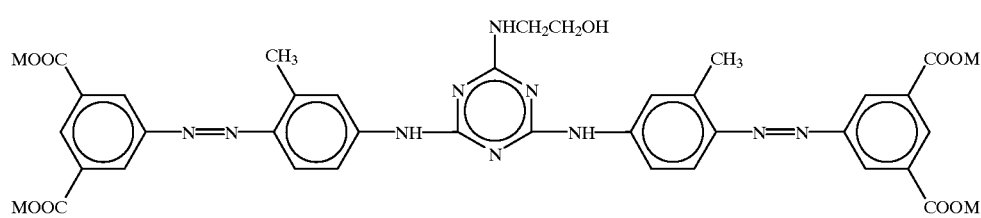

Exemplary Compound 3

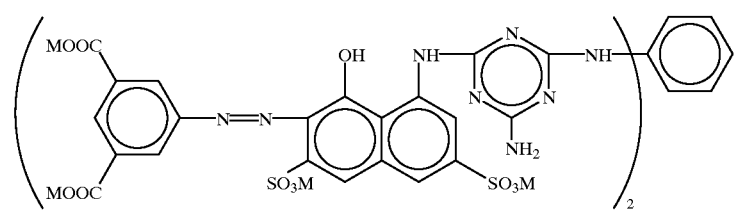

Exemplary Compound 4

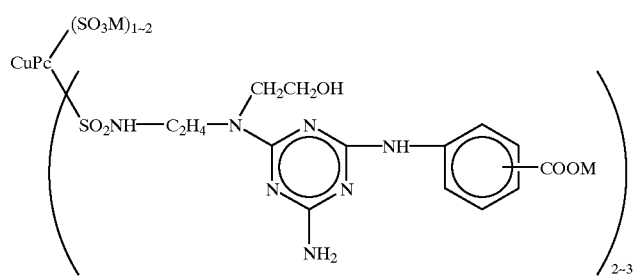

wherein M denotes an alkali metal, ammonium or organic ammonium.

5
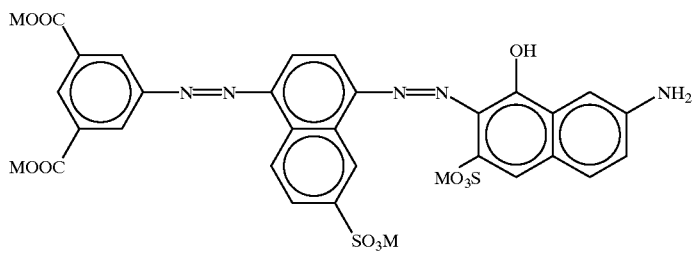
Exemplary Compound 5
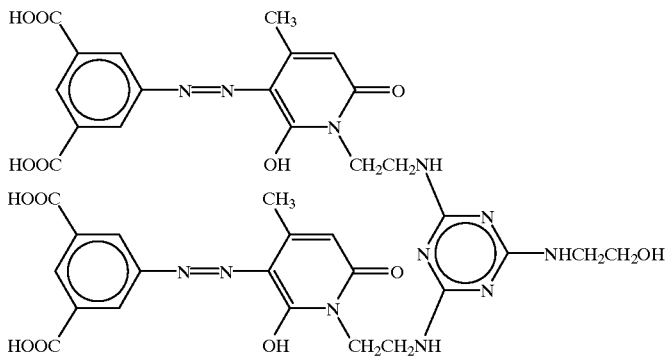
Exemplary Compound 6
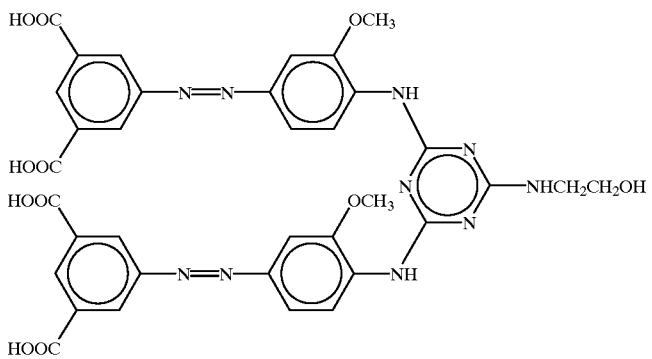
Exemplary Compound 7
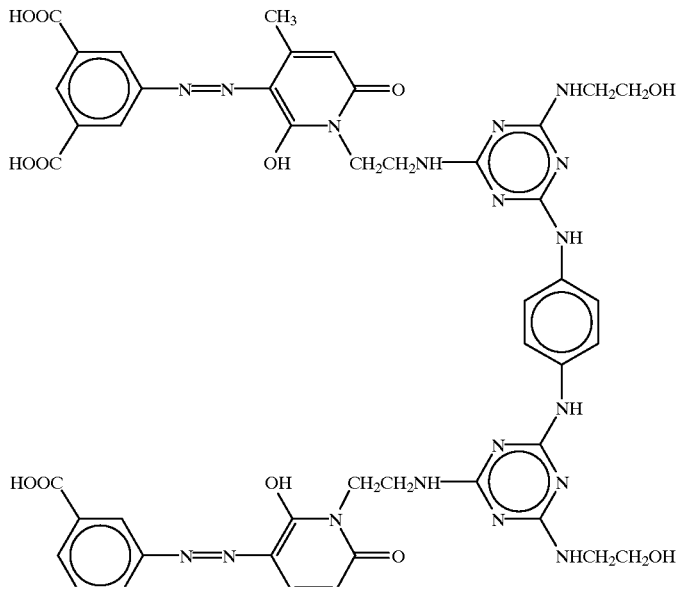
Exemplary Compound 8

As the coloring material contained in the color ink according to this embodiment, the dyes and pigments described above may be used either singly or in any combination thereof. The concentration of these dyes and pigments is preferably within a range of from 0.1 to 20% by mass based on the total amount of the ink.

The liquid media used in the liquid composition according to this embodiment and the color ink together with the liquid composition will hereinafter be described. As the liquid medium, a mixed solvent of water and a water-soluble organic solvent is preferably used.

As the water used in this embodiment, it is desirable to use deionized water instead of tap water containing various ions. The content of water is preferably within a range of from 35 to 96% by mass based on the total amount of the ink. The water-soluble organic solvent used in combination with water may be suitably selected from water-soluble organic solvents mentioned below depending on the end application intended. Since the water-soluble organic solvent can control the viscosity of the ink to a preferable proper viscosity for use, it is used for the purpose of slowing the drying speed of the ink and enhancing the solubility of the coloring material to prevent orifices in a recording head from being clogged.

Specific examples of the water-soluble organic solvent include alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones and ketone alcohols such as acetone and diacetone alcohol; ethers such as tetrahydrofuran and dioxane; oxyethylene or oxypropylene copolymers such as diethylene glycol, triethylene glycol, tetraethylene glycol, dipropylene glycol, tripropylene glycol, polyethylene glycol and polypropylene glycol; alkylene glycols the alkylene moiety of which has 2 to 6 carbon atoms, such as ethylene glycol, propylene glycol, trimethylene glycol and triethylene glycol; 1,2,6-hexanetriol; glycerol; trimethylolethane, trimethylolpropane; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; lower dialkyl ethers of polyhydric alcohols, such as triethylene glycol dimethyl (or diethyl) ether and tetraethylene glycol dimethyl (or diethyl) ether; alkanolamines such as monoethanolamine, diethanolamine and triethanolamine; sulfolane; N-methyl-2-pyrrolidone; 2-pyrrolidone; and 1,3-dimethyl-2-imidazolidinone. The water-soluble organic solvents mentioned above may be used either singly or in any combination thereof.

In order to make the pH of the color ink according to this embodiment constant to stabilize the solubility of the dye or the dispersibility of the pigment in the color ink, a pH adjustor may be added to the color ink. Specific examples of the pH adjustor include hydroxides such as lithium hydroxide, sodium hydroxide, potassium hydroxide and ammonium hydroxide; sulfates such as lithium sulfate, sodium sulfate, potassium sulfate and ammonium sulfate; carbonates such as lithium carbonate, sodium carbonate, sodium hydrogen carbonate, potassium carbonate, potassium hydrogencarbonate, ammonium carbonate and ammonium hydrogencarbonate; phosphates such as lithium phosphate, monosodium phosphate, disodium phosphate, trisodium phosphate, monopotassium phosphate, dipotassium phosphate, tripotassium phosphate, monoammonium phosphate, diammonium phosphate and triammonium phosphate; and acetates such as lithium acetate, sodium acetate, potassium acetate and ammonium acetate.

These salts may be added singly to the color ink. However, it is preferable to use two or more of these salts in combination. These salts are preferably added in a proportion of 0.1 to 10% by mass, more preferably 1 to 8% by mass for the purpose of keeping the pH stable, enhancing the solution stability of the water-soluble dye contained in the color ink and preventing problems such as clogging of orifices.

In the liquid composition according to this embodiment and the color ink to be used with the liquid composition, various kinds of conventionally known general additives, for example, viscosity modifiers, mildewproofing agents, preservatives, antioxidants, antifoaming agents, and agents for preventing drying at orifices, such as urea may further be suitably used in combination in addition to the components described above, as needed.

With respect to preferable physical property ranges of the liquid composition according to this embodiment and the color ink to be used with the liquid composition, at a temperature near 25° C. particularly suitable for ink-jet recording, the pH is preferably within a range of from 3 to 12, more preferably from 4 to 10, the surface tension is preferably within a range of from 10 to 60 mN/m (dyn/cm), more preferably 15 to 50 mN/m (dyn/cm), and the viscosity is preferably within a range of from 1 to 30 cP, more preferably from 1 to 10 cP.

The ink-jet recording process according to this embodiment is an ink-jet recording process in which the liquid composition and color ink having such respective constitutions as described above are used in combination and applied onto a recording medium so as to bring them into contact with each other, thereby conducting recording. No particular limitation is imposed on the recording medium used at this time. However, the ink-jet recording process according to this embodiment is particularly preferably applied to the formation of images on the so-called plain paper such as paper for copying or bond paper, which has been used heretofore, because the effect of lessening the occurrence of bleeding is markedly developed.

The order of the liquid composition and ink applied to a recording medium upon formation of images may be optional. Namely, any of the liquid composition and the color ink may be first applied. The liquid composition may be applied after the color ink is applied, and the color ink may further be applied again.

Namely, in this embodiment, the liquid composition is applied onto the recording medium so as to bring it into contact with the color ink, whereby good character quality, fixing ability and water fastness of an image formed by the color ink, and improvement in bleeding-preventing effect are achieved irrespective of the order and method of their application. This is considered to be attributable to the fact that aggregation, precipitation or viscosity increase of the color ink occurs on the recording medium by, for example, mixing of the polyvalent metal ion in the liquid composition with the pigment and/or dye in the color ink.

Figure 17:
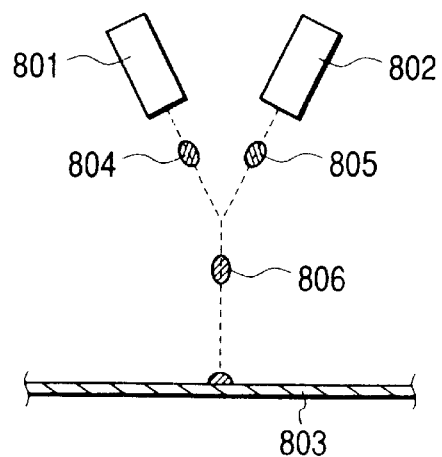
FIG. 17 schematically illustrate an ink-jet recording process according to an embodiment of the present invention.

From the viewpoints of improving optical density and fixing ability, it is particularly preferred that the liquid composition be applied after the color ink is applied, and the color ink be further applied subsequently thereto. In the case where the application of the liquid composition is conducted prior to the application of the color ink, no particular limitation is imposed on the time required from the time the liquid composition is applied to the recording medium up to the time the color ink is then applied. In order to perform the present invention more effectively, however, it is desirable to apply the color ink within several seconds, particularly preferably, within one second. The same shall apply to the case where the liquid composition and the color ink are applied to the recording medium in reversed order. As illustrated in FIG. 17, the liquid composition (804) and the color ink (805) may be ejected from respective recording heads (801, 802) of an ink-jet recording apparatus and mixed (806) with each other just after the ejection to apply the mixture to the recording medium (803).

The quantitative ratio of the color ink to the liquid composition to be applied to the unit area of a recording medium in an image forming region may be 1:1. However, the ratio of the color ink to the liquid composition may be within a range of from 10:1 to 10:10. Incidentally, the amounts of the color ink and liquid composition to be applied to the unit area of the recording medium in the image forming region may be specifically controlled in accordance with, for example, a method in which the application of the liquid composition and color ink are conducted by an ink-jet recording system in such a manner that the number of pixels of the liquid composition applied to the recording medium is within a range of from 10% to 100% of the number of pixels of the color ink applied to the recording medium, a method in which the application of the liquid composition and color ink are conducted by an ink-jet recording system in such a manner that the amount of the liquid composition ejected is controlled so as to becomes smaller than the amount of the color ink ejected to adjust the ejection quantity of the liquid composition applied to the recording medium to a range of from 10% to 100% of the ejection quantity of the color ink applied to the recording medium, or a combined method thereof.

As a method for applying the liquid composition according to the present invention and the color ink to a recording medium, an ink-jet recording method is preferably used as described above. Various kinds of conventionally known ink-jet recording systems may be used as the ink-jet recording method. However, an ink-jet recording method making good use of thermal energy and an ink-jet recording method making good use of mechanical energy by deformation of a piezoelectric element are preferably used in the present invention.

First of all, an ink-jet recording apparatus making good use of thermal energy will hereinafter be described with reference to the drawings.

Figure 2:
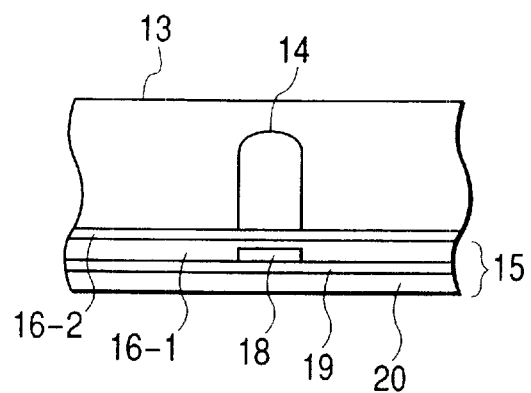
FIG. 2 is a transverse cross-sectional view illustrating the exemplary head of the ink-jet recording apparatus.

An exemplary construction of a head, which is a main component of the ink-jet recording apparatus making good use of thermal energy is shown in FIGS. 1 and 2. FIG. 1 is a cross-sectional view of a head 13 taken along the flow path of ink, and FIG. 2 is a cross-sectional view taken along line 2—2 in FIG. 1. The head 13 is formed by bonding a glass, ceramic, silicon, polysulfone or plastic plate or the like having a flow path (nozzle) 14 through which an ink is passed, to a heating substrate 15. The heating substrate 15 is composed of a protective layer 16-1 made of silicon oxide, silicon nitride, silicon carbide or the like, an uppermost protective layer 16-2 made of a metal such as platinum, or a metal oxide such as platinum oxide, preferably tantalum or tantalum oxide, electrodes 17-1 and 17-2 formed of aluminum, gold, aluminum-copper alloy or the like, a heating resistor layer 18 formed of a high-melting material such as hafnium boride, tantalum nitride or aluminum tantalum, a heat accumulating layer 19 formed of silicon oxide, aluminum oxide or the like, and a substrate 20 made of silicon, aluminum, aluminum nitride or the like having a good heat radiating property.

Figure 3:
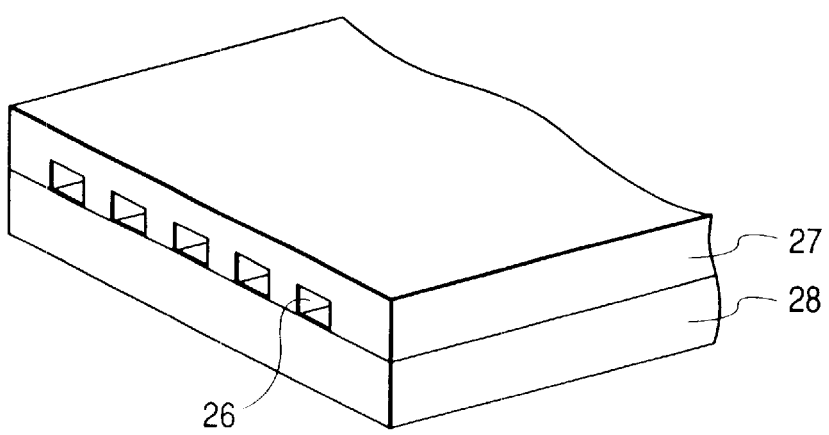
FIG. 3 is a perspective view illustrating the appearance of a multi-head which is an array of such heads as shown in FIG. 1.

Now, upon application of pulsed electric signals to the electrodes 17-1 and 17-2 of the head 13, the heating substrate (heater) 15 rapidly generates heat at the region shown by "n" to form bubbles in an ink 21 which is in contact with this region. A meniscus 23 of the ink is projected by the pressure thus produced, and the ink 21 is ejected from an ejection opening 22 through the nozzle 14 of the head 13 toward a recording medium 25 in the form of an ink droplet 24. FIG. 3 illustrates an appearance of a multi-head composed of an array of a number of heads as shown in FIG. 1. The multi-head is formed by closely bonding a glass plate 27 having a number of grooves 26 to a heating head 28 similar to that described in FIG. 1.

Figure 4:
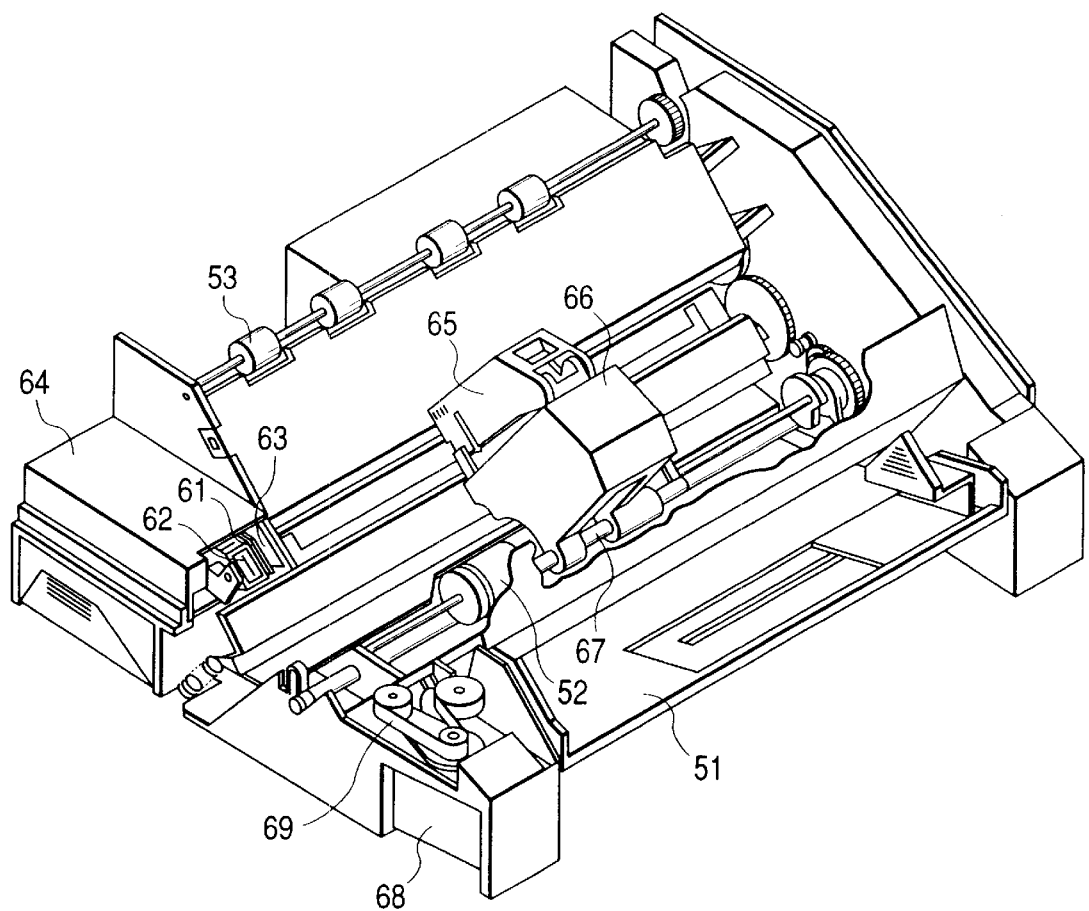
FIG. 4 is a schematic perspective view illustrating an exemplary ink-jet recording apparatus.

FIG. 4 illustrates an example of an ink-jet recording apparatus in which such a head as described above has been incorporated. In FIG. 4, reference numeral 61 designates a blade serving as a wiping member, one end of which is a stationary end held by a blade-holding member to form a cantilever. The blade 61 is provided at a position adjacent to a region in which a recording head 65 operates, and in this embodiment, is held in such a form that it protrudes into the course through which the recording head 65 is moved.

Reference numeral 62 indicates a cap for the face of ejection openings of the recording head 65, which is provided at a home position adjacent to the blade 61, and is so constructed that it moves in a direction perpendicular to a direction in which the recording head 65 is moved, and comes into contact with the face of the ejection openings to cap it. Reference numeral 63 denotes an ink absorbing member provided adjoiningly to the blade 61 and, similar to the blade 61, held in such a form that it protrudes into the course through which the recording head 65 is moved. The above-described blade 61, cap 62 and ink absorbing member 63 constitute an ejection-recovery portion 64, where the blade 61 and ink absorbing member 63 remove water, dust and/or the like from the face of the ink-ejecting openings.

Reference numeral 65 designates the recording head having an ejection-energy-generating means and serving to eject the ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide shaft 67 and is connected (not illustrated) at its part to a belt 69 driven by a motor 68. Thus, the carriage 66 can be moved along the guide shaft 67 and hence, the recording head 65 can be moved from a recording region to a region adjacent thereto.

Reference numerals 51 and 52 denote a feeding part from which the recording medium is inserted, and feed rollers driven by a motor (not illustrated), respectively. With such a construction, the recording medium is fed to the position opposite to the ejection opening face of the recording head 65, and discharged from a discharge section provided with discharge rollers 53 with the progress of recording. In the above construction, the cap 62 in the ejection-recovery portion 64 is receded from the path of motion of the recording head 65 when the recording head 65 is returned to its home position after completion of recording, and the blade 61 remains protruded into the path of motion. As a result, the ejection opening face of the recording head 65 is wiped.

When the cap 62 comes into contact with the ejection opening face of the recording head 65 to cap it, the cap 62 is moved so as to protrude into the path of motion of the recording head 65. When the recording head 65 is moved from its home position to the position at which recording is started, the cap 62 and the blade 61 are at the same positions as the positions for the wiping as described above. As a result, the ejection opening face of the recording head 65 is also wiped at the time of this movement. The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
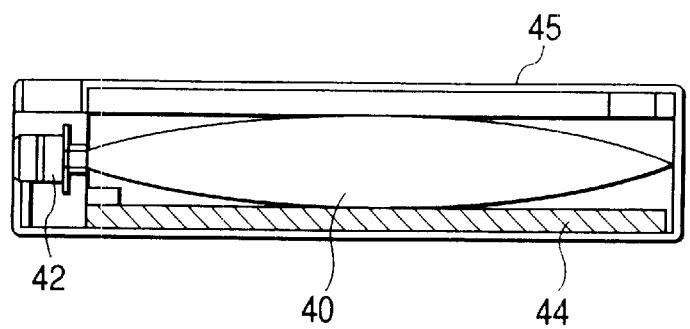
FIG. 5 is a longitudinal cross-sectional view illustrating an exemplary ink cartridge.

FIG. 5 illustrates an exemplary ink cartridge 45 in which an ink to be fed to a recording head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an absorbing member for receiving a waste ink. It is preferred that the ink container portion 40 be formed of a polyolefin, in particular, polyethylene, at its surface with which the ink comes into contact.

Figure 6:
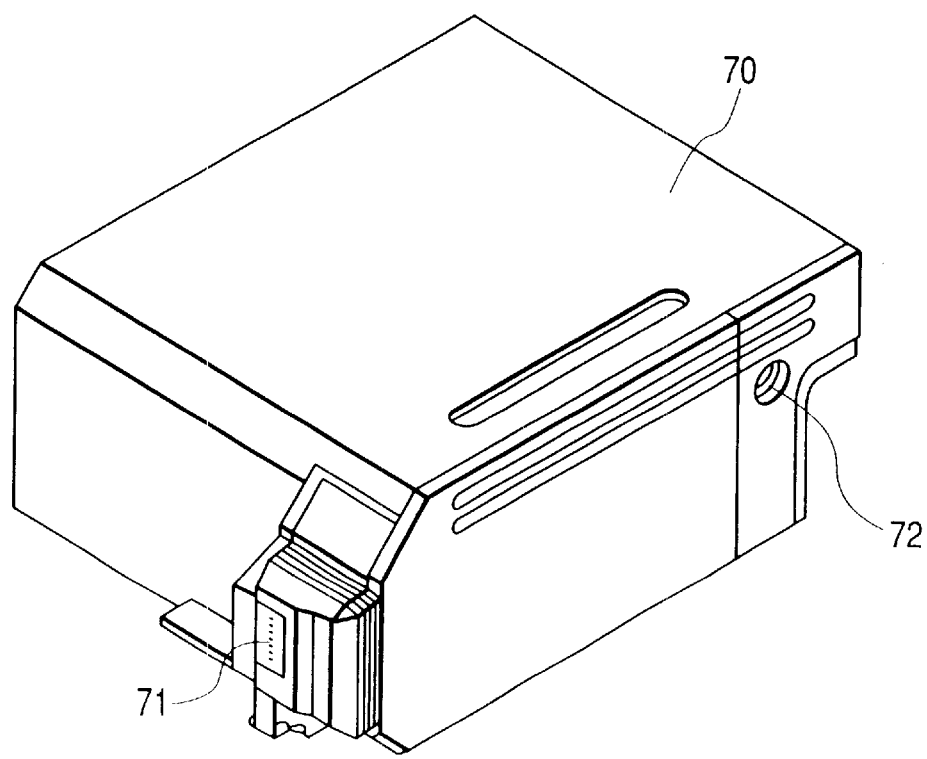
FIG. 6 is a perspective view illustrating an exemplary recording unit.

The ink-jet recording apparatus according to this embodiment are not limited to the apparatus as described above in which the head and the cartridge are separately provided. Therefore, a device in which these members are integrally formed as shown in FIG. 6 can also be preferably used. In FIG. 6, reference numeral 70 designates a recording unit, in the interior of which an ink container portion containing an ink, for example, an ink absorbing member, is contained. The recording unit 70 is so constructed that the ink in such an ink absorbing member is ejected in the form of ink droplets through a head 71 having a plurality of orifices. Polyurethane is preferably used as a material for the ink absorbing member. The ink container portion may be constructed without using the ink absorbing member by a bag for the ink in the interior of which a spring or the like is provided. Reference numeral 72 indicates an air passage for communicating the interior of the recording unit 70 with the atmosphere. This recording unit 70 is used in place of the recording head 65 shown in FIG. 4, and is detachably installed on the carriage 66.

As an ink-jet recording apparatus of another system than the above, may be mentioned an On-Demand type ink-jet recording apparatus comprising a nozzle-forming substrate having a plurality of nozzles, pressure-generating devices composed of a piezoelectric material and an electric conductive material provided in an opposing relation to the nozzles, and an ink filled around the pressure-generating devices, wherein the displacement of the pressure-generating devices is caused by voltage applied to eject droplets of the ink from the nozzles. An example of the construction of a recording head, which is a main component of such a recording apparatus, is illustrated in FIG. 7.

The head is composed of an ink flow path 80 communicating with an ink chamber (not illustrated), an orifice plate 81 through which ink droplets having a desired volume are ejected, a vibration plate 82 for directly applying a pressure to the ink, a piezoelectric element 83 bonded to the vibration plate 82 undergoing a displacement according to an electric signal, and a substrate 84 adapted to support and fix the orifice plate 81, the vibration plate 82 and the like thereon.

Figure 7:
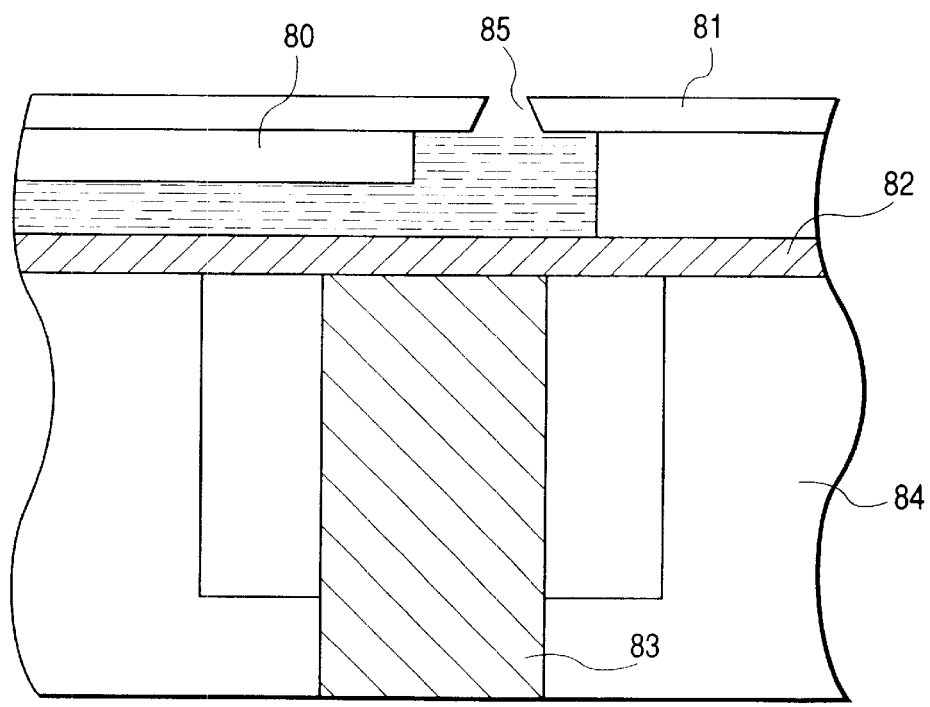
FIG. 7 is a schematic cross-sectional view illustrating an exemplary construction of an ink-jet recording head making good use of energy of a piezoelectric element.

In FIG. 7, the ink flow path 80 is formed with a photosensitive resin or the like. The orifice plate 81 is made of a metal such as stainless steel or nickel, and an ejection opening 85 of which is formed by electroforming, punching by press working, or the like. The vibration plate 82 is formed of a film of a metal such as stainless steel, nickel or titanium and a high-modulus resin film or the like. The piezoelectric element 83 is made of a dielectric material such as barium titanate or PZT.

The recording head with the above construction is operated in such a manner that pulsed voltage is applied to the piezoelectric element 83 to generate a stress to cause strain, the vibration plate 82 bonded to the piezoelectric element 83 is deformed by the energy of the stress, and the ink in the ink flow path 80 is thus perpendicularly pressurized to eject ink droplets (not illustrated) from the ejection opening 85 of the orifice plate 81, thereby conducting recording. Such a recording head is used by incorporating it into an ink-jet recording apparatus similar to that illustrated in FIG. 4. Operation of details of the ink-jet recording apparatus may be conducted in the same manner as described above.

Figure 8:
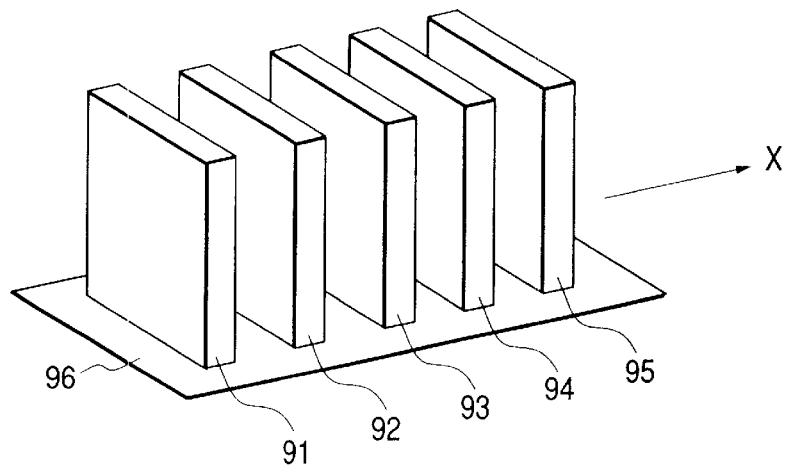
FIG. 8 is a perspective view illustrating a recording part in which a plurality of recording heads are arranged.
Figure 9:
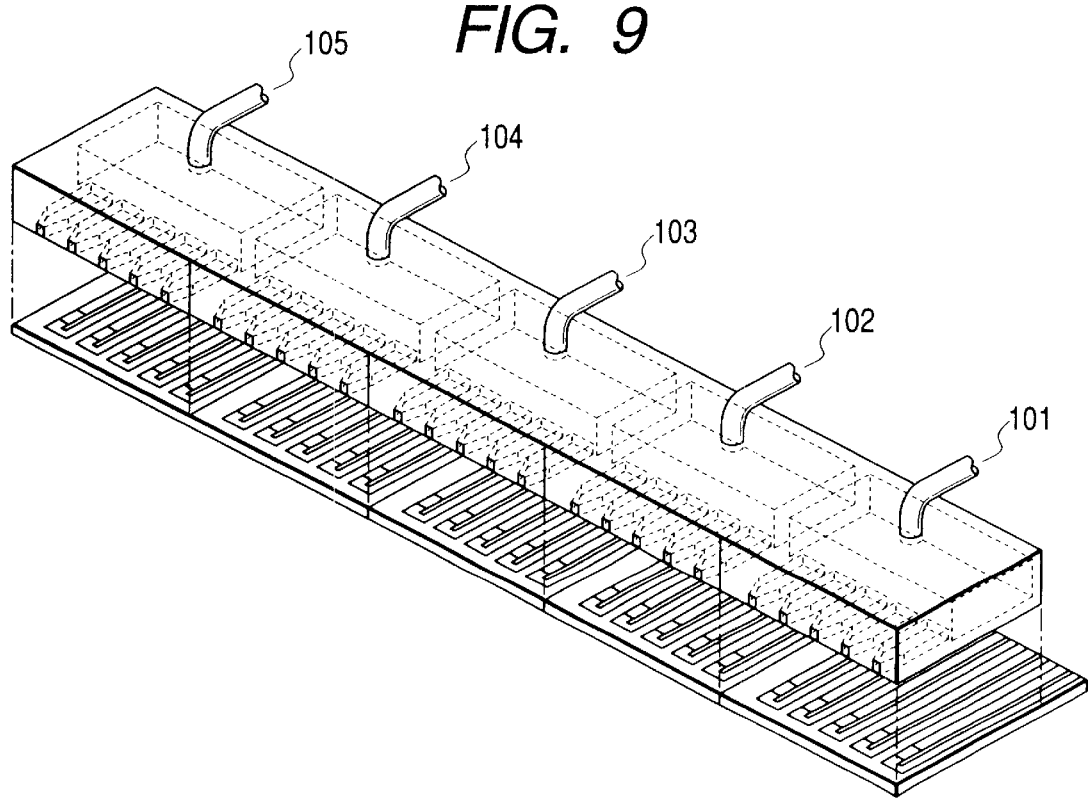
FIG. 9 is a perspective view of another recording head used in the present invention.

When a color image is formed in accordance with the ink-jet recording method according to this embodiment, for example, a recording apparatus in which five recording heads, each of which has been illustrated in FIG. 3, are arranged on a carriage 96, is used. An embodiment thereof is illustrated in FIG. 8. Reference numerals 91, 92, 93 and 94 indicate recording heads for ejecting inks of yellow, magenta, cyan and black colors, respectively. Reference numeral 95 indicates a recording head for ejecting the liquid composition. The recording heads are arranged in the above-described recording apparatus and eject the respective color inks according to recording signals. The liquid composition is applied to at least image-forming portions of a recording medium where the color inks are applied thereto, for example, by moving the carriage in an X-direction. FIG. 8 shows the case where the five recording heads are used. However, the present invention is not limited thereto. For example, an embodiment, wherein color inks of yellow 101, magenta 102, cyan 103 and black 104, and a liquid composition 105 are ejected from a recording head, in which ink flow paths are separately formed as shown in FIG. 9, is also included. It goes without saying that a recording head may be so constructed that the color inks and the liquid composition are ejected in reverse against the above-described order.

Figure 10:
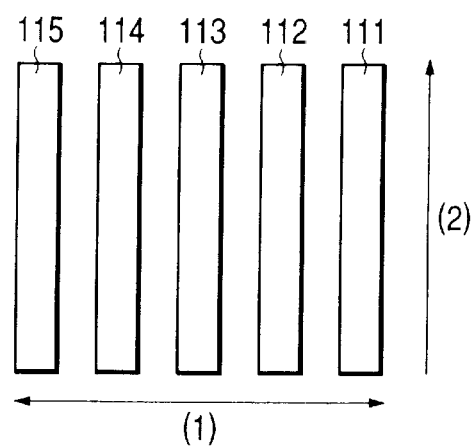
FIG. 10 illustrates a first exemplary construction of a recording head.
Figure 11:
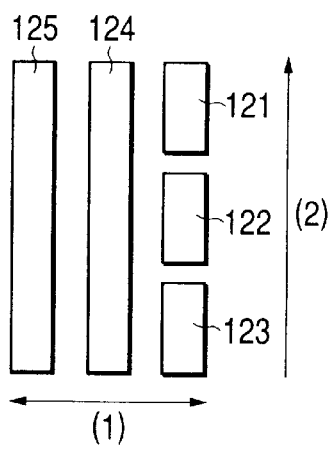
FIG. 11 illustrates a second exemplary construction of a recording head.
Figure 12:
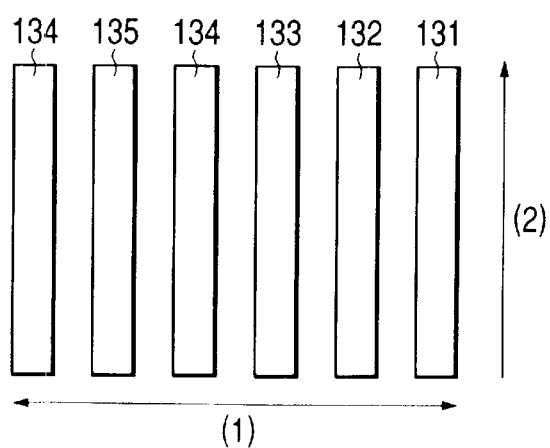
FIG. 12 illustrates a third exemplary construction of a recording head.

Specific constructional examples of arrangement of ink-jet recording heads suitably used in this embodiment include such three cases as illustrated in FIGS. 10 to 12. In FIGS. 10 to 12, reference numerals 111 to 114, 121 to 124, and 131 to 134 each indicate recording heads for ejecting coloring inks of yellow (Y), magenta (M), cyan (C) and black (Bk), respectively. Reference numerals 115, 125 and 135 designate recording heads for ejecting a liquid composition (S). The respective recording heads are arranged on a carriage as illustrated in FIG. 8 (it varies according to the constructional example). The recording heads are arranged in the above-described recording apparatus and eject the respective color inks according to recording signals. The liquid composition is applied to at least image-forming portions of a recording medium where the coloring inks are applied thereto, before or after the application of the coloring inks. The recording heads are moved by the carriage in directions of arrows (1), and the recording medium is moved by feed rollers or the like in a direction of an arrow (2).

In the first constructional example shown in FIG. 10, the recording heads for S (115), Bk (114), Y (113), M (112) and C (111) are arranged in parallel on the carriage. The second constructional example shown in FIG. 11 comprises the recording heads for the liquid composition (125) and black ink (124) arranged in parallel, and recording heads for Y (123), M (122) and C (121) arranged in parallel with these recording heads and in series from one another. The ejection volumes per dot of the respective recording heads are not always the same, and the ejection volume (Vd) per dot of each recording head may be adjusted so as to optimize recording suitability. It is preferred that the Vd of S, Y, M and C be made equal, and the Vd of Bk be doubled. However, the construction is not limited thereto. In the third constructional example shown in FIG. 12, the recording heads for Bk (134), S (135), Bk (134), Y (133), M (132) and C (131), in which the ejection volumes are equal, are arranged in parallel on the carriage, and so the amount of the black ink ejected can be made twice as much as each ejection quantity of the other liquid composition and color inks.

Second Embodiment

Next, is described a specific second embodiment of the present invention, in which an ink set for ink-jet recording, which comprises at least one color ink comprising a polyvalent metal salt of aldonic acid and a coloring material, and a black ink comprising a coloring material capable of reacting with the polyvalent metal salt, is used. In this embodiment, the color ink and the black ink are applied to a recording medium so as to form a contact state, to conduct recording.

In the ink set according to this embodiment, it is intended to prevent bleeding between the black ink and the color ink, and no particular measure is taken for prevention of bleeding between the color inks. However, when the color inks are designed so as to promote the penetrability thereof into sized plain paper, for example, by adding a surfactant to the color inks, such color inks are effective for the prevention of bleeding between the color inks.

The color inks making up the ink set according to this embodiment will be first described. The color inks used in this embodiment comprise a coloring material, a liquid medium and a polyvalent metal salt of aldonic acid. The polyvalent metal salt of aldonic acid is as described in detail in the first embodiment.

The coloring material contained in each of the color inks making up the ink set according to this embodiment will be then described. Examples of the coloring material include direct dyes, acid dyes, basic dyes, disperse dyes and pigments. The coloring material is preferably such that it causes no reaction with the polyvalent metal salt of aldonic acid even when it is mixed with such a salt, and so its solubility is retained. Specific examples of such a coloring material include:

C.I. Acid Yellow 23;

C.I. Acid Red 52 and 289;

C.I. Acid Blue 9;

C.I. Reactive Red 180;

C.I. Direct Blue 189 and 199;

C.I. Basic Yellow 1, 2, 11, 13, 14, 19, 21, 25, 32, 33, 36 and 51;

C.I. Basic Orange 2, 15, 21 and 22;

C.I. Basic Red 1, 2, 9, 12, 13, 37, 38, 39 and 92;

C.I. Basic Violet 1, 3, 7, 10 and 14;

C.I. Basic Blue 1, 3, 5, 7, 9, 19, 24, 25, 26, 28, 29, 45, 54 and 65;

C.I. Basic Green 1 and 4;

C.I. Basic Brown 1 and 12; and

C.I. Basic Black 2 and 8.

However, the coloring materials are not limited thereto. These water-soluble dyes may be used either singly or in any combination thereof. The concentration of these water-soluble dyes is preferably within a range of from 0.1 to 20% by mass based on the total amount of the ink.

In addition to the components described above, at least one surfactant may preferably be contained in each of the color inks making up the ink set according to this embodiment. The desired penetrability and viscosity can be imparted to the color inks by containing the surfactant to still more satisfy the performance required of inks for ink-jet recording. More specifically, as described above, such a color ink comes to have high penetrability for plain paper by adding the surfactant to the color ink and is effective for prevention of bleeding between color inks.

No particular limitation is imposed on the amount of the surfactant added. In order to achieve the desired penetrability and give a proper viscosity to the resulting ink, however, it is preferably within a range of from 0.01 to 10% by mass, more preferably from 0.1 to 5% by mass based on the total amount of the ink.

The black ink making up the ink set according to this embodiment will now be described. The black ink used in this embodiment comprises a coloring material capable of reacting with the polyvalent metal salt of aldonic acid and a liquid medium. As the coloring material of the black ink, may be used the coloring materials of black usable in the color inks according to the first embodiment. These coloring material may be used either singly or in any combination. The amount of these coloring material added is preferably within a range of from 0.1 to 20% by mass based on the total amount of the ink.

It is more preferable to add a nonionic surfactant to the black ink. The addition of the nonionic surfactant still more prevents bleeding between the black ink and the color ink and moreover brings about an effect of preventing decrease in the density of the black ink at boundaries between the black ink and the color inks, i.e., occurrence of the so-called "whitish haze".

As described above, the surfactant is preferably contained in the color inks used in the ink set according to this embodiment. Therefore, such an ink is often high in penetrability into recording media such as plain paper and low in surface tension. When such a color ink having a low surface tension comes into contact with the black ink having a high surface tension, a region containing less coloring material occurs at the interface between the black ink and the color ink, and so a phenomenon called "whitish haze" may occur in some cases. When the nonionic surfactant is added to the black ink to lower its surface tension, the "whitish haze" phenomenon can be effectively prevented.

In this embodiment, no particular limitation is imposed on the content of the nonionic surfactant in the black ink. In order to facilitate the prevention of bleeding between the black ink and the color ink, effectively prevent the occurrence of whitish haze and retain good ink ejection stability and image quality, however, it is preferably within a range of from 0.1 to 0.5% by mass, particularly preferably from 0.2 to 0.4% by mass based on the total amount of the ink.

Examples of the nonionic surfactant contained in the black ink according to this embodiment include ethylene oxide adducts of higher alcohols, ethylene oxide adducts of alkylphenols, ethylene oxide adducts of fatty acids, ethylene oxide adducts of polyhydric alcohol fatty acid esters, ethylene oxide adducts of aliphatic amides, ethylene oxide adducts of higher alkylamines, ethylene oxide adducts of polypropylene glycol, polyhydric alcohol fatty acid esters and alkanolamine fatty acid amides. All these nonionic surfactants are preferably used. However, nonionic surfactants such as ethylene oxide adducts of higher alcohols, ethylene oxide adducts of alkylphenols, ethylene oxide-propylene oxide copolymers, ethylene oxide adducts of acetylene glycol may be more preferably used. It is still more preferable that the number of moles of ethylene oxide added in the above-described ethylene oxide adducts be within a range of from 4 to 20.

With respect to the liquid media used in the black ink and color inks making up the ink set according to this embodiment, the water-soluble organic solvents described in detail as the liquid media used in the liquid composition according to the first embodiment and the color inks used together with the liquid composition, the additives used therein, their amounts added and their physical property values, and the like may be used.

The ink-jet recording process according to this embodiment and the recording apparatus according to this embodiment, by which the recording process can be realized, will be described.

The ink-jet recording process according to this embodiment is an ink-jet recording process in which energy is applied to inks to eject the inks, thereby recording a color image on a recording medium, wherein the ink set for ink-jet recording according to this embodiment described above is used as the inks. No particular limitation is imposed on the recording medium used at this time. However, the ink-jet recording process according to this embodiment is particularly preferably applied to the formation of images on the so-called plain paper such as paper for copying or bond paper, which has been used heretofore, because the effect of lessening bleeding between the black ink and the color inks is markedly developed. It goes without saying that the ink-jet recording process according to this embodiment can be suitably applied to, for example, coated paper specially prepared for ink-jet recording and transparent films for OHP. The process may also be suitably applied to general wood free paper and glossy paper.

As a method for applying the black ink and the color inks to a recording medium in the ink-jet recording process according to this embodiment, may be mentioned a method in which the black ink and the color ink are applied so as to come into contact with each other at boundaries therebetween.

As another mode, may be mentioned a first method in which the black ink and the color ink are applied to a recording medium so as to overlap each other on the recording medium, and the application of the color ink is conducted prior to the application of the black ink. When such first method is performed, the prevention of bleeding between the black ink and the color inks is more facilitated, and moreover the lessening of "whitish haze" described above and improvement of water fastness are also achieved. In the first method, no particular limitation is imposed on the time required from the time the color ink is applied to the recording medium up to the time the black ink is then applied. In order to perform the present invention more effectively, however, it is desirable to apply the black ink within several seconds, particularly preferably, within one second. There may be mentioned a second method in which the color inks are applied after application of the black ink, and a mode in which the color ink and the black ink are mixed with each other just after their ejection as illustrated in FIG. 17.

In the first method, the quantitative ratio of the black ink to the color ink to be applied to the unit area of a recording medium in an image forming region may be 1:1. However, the ratio of the black ink to the color ink may be controlled within a range of from 10:1 to 10:10, whereby the whitish haze of the resulting image is lessened, and even solid printing is achieved. Incidentally, the control of amounts of the black ink and color ink to be applied to the unit area of the recording medium in the image forming region may be specifically made by, for example, the following various methods. Namely, the methods include a method in which the number of pixels of the color ink applied to the recording medium is controlled within a range of from 10% to 100% of the number of pixels of the black ink applied to the recording medium; a method in which the application of the black ink and color ink are conducted by an ink-jet recording system, wherein the amount of the color ink ejected is controlled so as to becomes smaller than the amount of the black ink ejected; and a combined method thereof in which the number of pixels of the color ink applied to the recording medium is controlled within a range of from 10% to 100% of the number of pixels of the black ink applied to the recording medium, and the application of the black ink and color ink are conducted by an ink-jet recording system, wherein the amount of the color ink ejected is controlled so as to becomes smaller than the amount of the black ink ejected.

As a method for applying the black ink and color inks to a recording medium in this embodiment, an ink-jet recording method is used. Various kinds of conventionally known ink-jet recording systems may be used as the ink-jet recording method. However, in the present invention, are particularly preferred an ink-jet recording method making good use of thermal energy and an ink-jet recording method making good use of mechanical energy by deformation of a piezoelectric element. The ink-jet recording method making good use of thermal energy is as described in detail in the first embodiment.

Figure 13:
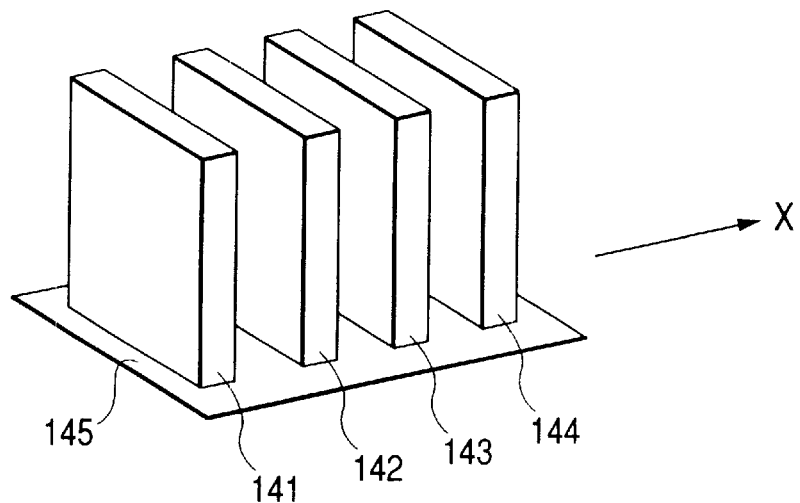
FIG. 13 is a perspective view illustrating a recording part in which a plurality of recording heads are arranged.

When a color image is formed in accordance with the ink-jet recording method according to this embodiment, for example, a recording apparatus in which four recording heads, each of which has been illustrated in FIG. 3, are arranged on a carriage 145, is used. An embodiment thereof is illustrated in FIG. 13. Reference numerals 141, 142, 143 and 144 indicate recording heads for ejecting a black ink (Bk), a yellow ink (Y), a magenta ink (M) and a cyan ink (C), respectively. The recording heads are arranged in the above-described recording apparatus and eject the respective color inks according to recording signals, for example, while moving the carriage in an X-direction.

Figure 14:
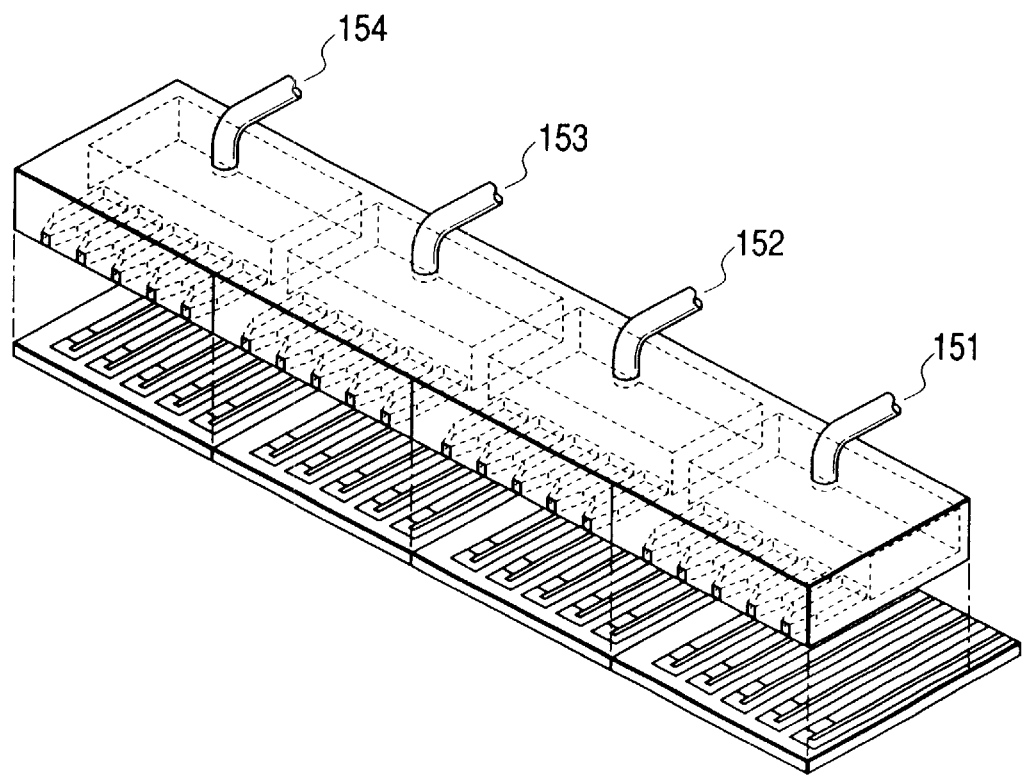
FIG. 14 is a perspective view of a further recording head used in the present invention.

FIG. 13 shows the case where the four recording heads are used. However, the present invention is not limited thereto. For example, an embodiment, wherein inks of black 154, yellow 151, magenta 152 and cyan 153 are ejected from a recording head, in which ink flow paths are separately formed as shown in FIG. 14, is also included.

Figure 15:
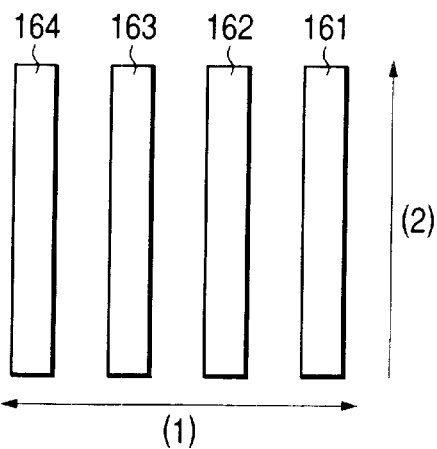
FIG. 15 illustrates a fourth exemplary construction of a recording head.
Figure 16:
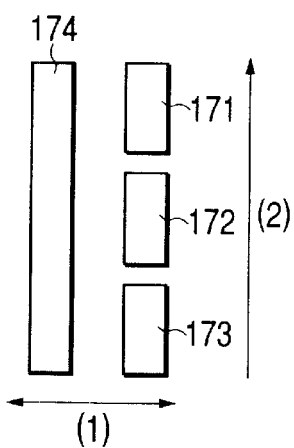
FIG. 16 illustrates a fifth exemplary construction of a recording head.

Specific constructional examples of arrangement of ink-jet recording heads suitably used in this embodiment include such two cases as illustrated in FIGS. 15 and 16. In FIGS. 15 and 16, reference numerals 161 to 164 and 171 to 174 indicate recording heads for ejecting inks of yellow, magenta, cyan and black, respectively. The respective recording heads are arranged on a carriage as illustrated in FIG. 13 (it varies according to the constructional example). The recording heads are arranged in the above-described ink-jet recording apparatus and eject the respective inks according to recording signals. The recording heads are moved by the carriage in directions of arrows (1), and the recording medium is moved by feed rollers or the like in a direction of an arrow (2).

In the first constructional example shown in FIG. 15, the recording heads for Bk (164), Y (163), M (162) and C (161) are arranged in parallel on the carriage. The second constructional example shown in FIG. 16 comprises the recording head for the black ink (174), and recording heads for Y (173), M (172) and C (171) arranged in parallel with this recording head and in series from one another. In FIG. 15, this construction may be applied to the so-called line printer in which a carriage is fixed, and a recording medium is moved by feed rollers or the like in a direction of the arrow (2).

The present invention will hereinafter be described more specifically by the following Examples and Comparative Examples. However, the present invention is not limited to and by these examples so far as the subject matter of the present invention is not overstepped. Incidentally, all designations of "part" or "parts" and "%" as will be used in the following examples mean part or parts by mass and % by mass unless expressly noted.

EXAMPLES 1 TO 33

These examples are examples corresponding to the first embodiment.

The following respective components were used to prepare respective liquid compositions and color inks. The preparation of the liquid compositions and the color inks using a dye as a coloring material was conducted in the following manner. Namely, the following respective components were dissolved, and the resultant solutions were then separately filtered under pressure through a microfilter (product of Fuji Photo Film Co., Ltd.) having a pore size of 0.2 μm, thereby preparing respective liquid compositions and color inks. In the case of color inks using a pigment as a coloring material, a pigment dispersion was first prepared in accordance with its corresponding preparation process described below, the resultant dispersion was then mixed with a liquid medium and the like, and the resultant mixture was filtered under pressure through a microfilter (product of Sumitomo Electric Industries, Ltd.) having a pore size of 3 μm, thereby preparing each pigment ink.

The following respective components were dissolved, and the resultant solutions were then separately filtered under pressure through a microfilter (product of Fuji Photo Film Co., Ltd.) having a pore size of 0.2 μm, thereby preparing liquid compositions 1 to 4.

<Preparation of Liquid Composition 1>

| | |
|---|---|
| Diethylene glycol | 20 parts |
| Acetylenol EH (trade name, product of Kawaken Fine Chemicals Co., Ltd.) | 2 parts |
| Calcium gluconate | 2 parts |
| Water | 76 parts. |

<Preparation of Liquid Composition 2>

| | |
|---|---|
| Triethylene glycol monobutyl ether | 10 parts |
| Glycerol | 20 parts |
| Magnesium gluconate | 4 parts |
| Water | 66 parts. |

<Preparation of Liquid Composition 3>

| | |
|---|---|
| Diethylene glycol | 20 parts |
| Acetylenol EH (trade name, product of Kawaken Fine Chemicals Co., Ltd.) | 2 parts |
| Calcium DL-glycerate | 1.5 parts |
| Water | 76.5 parts. |

<Preparation of Liquid Composition 4>

| | |
|---|---|
| Diethylene glycol | 20 parts |
| Acetylenol EH (trade name, product of Kawaken Fine Chemicals Co., Ltd.) | 2 parts |
| Water | 78 parts. |

<Preparation of Black Ink 1>

Preparation of Pigment Dispersion 1

After 300 g of commercially-available acidic carbon black "MA-77" (trade name; pH: 3.0; product of Mitsubishi Kagaku Co., Ltd.) were thoroughly mixed with 1,000 ml of water, 450 g of sodium hypochlorite (available chlorine concentration: 12%) were added dropwise to the mixture, followed by stirring for 10 hours at 100 to 105° C. The resultant slurry was filtered through Toyo Filter Paper No. 2 (product of Advantes Co.) to fully wash the resultant pigment particles with water. The wet cake of this pigment was dispersed again in 3,000 ml of water, and the dispersion was desalted by means of a reverse osmosis membrane to a conductivity of 0.2 μs. The pigment dispersion (pH: 8 to 100) was concentrated to a pigment concentration of 10%. The above-described process was followed to obtain Pigment Dispersion 1 in which self-dispersing carbon black, to the surface of which a —COONa group was bonded, was dispersed.

Preparation of Ink

The following components including Pigment Dispersion 1 obtained above were mixed and filtered under pressure through a microfilter (product of Sumitomo Electric Industries, Ltd.) having a pore size of 3.0 μm, thereby preparing Black Ink 1.

| | |
|---|---|
| Pigment Dispersion 1 | 40 parts |
| Glycerol | 8 parts |
| Trimethylolpropane | 5 parts |
| Isopropyl alcohol | 4 parts |
| Water | 43 parts. |

<Preparation of Black Ink 2>

Preparation of Pigment Dispersion 2

| | |
|---|---|
| Styrene-acrylic acid-butyl acrylate terpolymer (acid value: 116; average molecular weight: 3,700) | 5 parts |
| Triethanolamine | 0.5 parts |
| Diethylene glycol | 5 parts |
| Water | 89.5 parts. |

The above components were mixed and heated to 70° C. in a water bath, thereby completely dissolving the resin component. To this solution, were added 15 parts of carbon black "MA-100" (trade name; pH: 3.5; product of Mitsubishi Kagaku Co., Ltd.) and 5 parts of 2-propanol to premix the components for 30 minutes. Thereafter, the resultant premix was subjected to a dispersing treatment under the following conditions:

Dispersing machine: sand grinder (manufactured by Igarashi Kikai K.K.)
Grinding medium: zirconium beads (diameter: 1 mm)
Packing rate of grinding medium: 50% (by volume)
Grinding time: 3 hours.

The thus-obtained dispersion was subjected to a centrifugal treatment (12,000 rpm, 20 minutes) to remove coarse particles, thereby preparing Pigment Dispersion 2 of carbon black.

Preparation of Ink

The following components including Pigment Dispersion 2 obtained above were mixed and filtered under pressure through a microfilter (product of Sumitomo Electric Industries, Ltd.) having a pore size of 3.0 μm, thereby preparing Black Ink 2.

| | |
|---|---|
| Pigment Dispersion 2 | 20 parts |
| Trimethylolpropane | 5 parts |
| Diethylene glycol | 10 parts |
| 2-Pyrrolidone | 5 parts |
| Acetylenol EH (trade name, product of Kawaken Fine Chemicals Co., Ltd.) | 0.2 parts |
| Water | 59.8 parts. |

<Preparation of Black Ink 3>

The following components were dissolved, and the resultant solution was then filtered under pressure through a microfilter (product of Fuji Photo Film Co., Ltd.) having a pore size of 0.2 μm, thereby preparing Black Ink 3.

| | |
|---|---|
| Exemplary Compound No. 1 (M: $NH_4^+$) | 2 parts |
| Diethylene glycol | 10 parts |
| 2-Pyrrolidone | 5 parts |
| 2-Propanol | 5 parts |
| Sodium hydroxide | 0.1 parts |
| Water | 77.9 parts. |

<Preparation of Yellow Ink 1>

Preparation of Pigment Dispersion 3

| | |
|---|---|
| Styrene-acrylic acid copolymer (acid value: 200; average molecular weight: 7,000) | 5.5 parts |
| Monoethanolamine | 1.0 part |
| Ion-exchanged water | 67.5 parts |
| Diethylene glycol | 5.0 parts. |

The above components were mixed and heated to 70° C. in a water bath, thereby completely dissolving the resin component. To this solution, were added 20 parts of C.I. Pigment Yellow 93 and 1.0 part of isopropyl alcohol to premix the components for 30 minutes. Thereafter, the resultant premix was subjected to a dispersing treatment under the following conditions:

Dispersing machine: sand grinder
Grinding medium: glass beads (diameter: 1 mm)
Packing rate of grinding medium: 50% (by volume)
Grinding time: 3 hours.

The thus-obtained dispersion was subjected to a centrifugal treatment (12,000 rpm, 20 minutes) to remove coarse particles, thereby preparing Pigment Dispersion 3.

Preparation of Ink

The following components including Pigment Dispersion 3 obtained above were mixed and filtered under pressure through a microfilter (product of Sumitomo Electric Industries, Ltd.) having a pore size of 3.0 μm, thereby preparing Yellow Ink 1.

| | |
|---|---|
| Pigment Dispersion 3 | 20 parts |
| Glycerol | 15 parts |
| Diethylene glycol | 10 parts |
| Acetylenol EH (trade name, product of Kawaken Fine Chemicals Co., Ltd.) | 0.3 parts |
| Water | 54.7 parts. |

<Preparation of Yellow Ink 2>

The following components were dissolved, and the resultant solution was then filtered under pressure through a microfilter (product of Fuji Photo Film Co., Ltd.) having a pore size of 0.2 μm, thereby preparing Yellow Ink 2.

| | |
|---|---|
| Exemplary Compound No. 2 (M: $NH_4^+$) | 3 parts |
| Glycerol | 7 parts |
| Diethylene glycol | 5 parts |
| Urea | 5 parts |
| Ethanol | 2 parts |
| Water | 78 parts. |

<Preparation of Magenta Ink 1>

Preparation of Pigment Dispersion 4

| | |
|---|---|
| Styrene-acrylic acid copolymer (acid value: 200; average molecular weight: 7,000) | 5.5 parts |
| Monoethanolamine | 1.0 part |
| Ion-exchanged water | 67.5 parts |
| Diethylene glycol | 5.0 parts. |

The above components were mixed and heated to 70° C. in a water bath, thereby completely dissolving the resin component. To this solution, were added 20 parts of C.I. Pigment Red 122 and 1.0 part of isopropyl alcohol to premix the components for 30 minutes. Thereafter, the resultant premix was subjected to a dispersing treatment under the following conditions:

Dispersing machine: sand grinder
Grinding medium: glass beads (diameter: 1 mm)
Packing rate of grinding medium: 50% (by volume)
Grinding time: 3 hours.

The thus-obtained dispersion was subjected to a centrifugal treatment (12,000 rpm, 20 minutes) to remove coarse particles, thereby preparing Pigment Dispersion 4.

Preparation of Ink

The following components including Pigment Dispersion 4 obtained above were mixed and filtered under pressure through a microfilter (product of Sumitomo Electric Industries, Ltd.) having a pore size of 3.0 μm, thereby preparing Magenta Ink 1.

| Pigment Dispersion 4 | 20 parts |
|---|---|
| Glycerol | 15 parts |
| Diethylene glycol | 10 parts |
| Acetylenol EH (trade name, product of Kawaken Fine Chemicals Co., Ltd.) | 0.3 parts |
| Water | 54.7 parts. |

<Preparation of Magenta Ink 2>

The following components were dissolved, and the resultant solution was then filtered under pressure through a microfilter (product of Fuji Photo Film Co., Ltd.) having a pore size of 0.2 μm, thereby preparing Magenta Ink 2.

| Exemplary Compound No. 3 (M: $NH^{4+}$) | 3 parts |
|---|---|
| Glycerol | 7 parts |
| Diethylene glycol | 5 parts |
| Urea | 5 parts |
| Ethanol | 2 parts |
| Water | 78 parts. |

<Preparation of Cyan Ink 1>

Preparation of Pigment Dispersion 5

| Styrene-acrylic acid copolymer (acid value: 200; average molecular weight: 7,000) | 5.5 parts |
|---|---|
| Monoethanolamine | 1.0 part |
| Ion-exchanged water | 67.5 parts |
| Diethylene glycol | 5.0 parts. |

The above components were mixed and heated to 70° C. in a water bath, thereby completely dissolving the resin component. To this solution, were added 20 parts of C.I. Pigment Blue 15:3 and 1.0 part of isopropyl alcohol to premix the components for 30 minutes. Thereafter, the resultant premix was subjected to a dispersing treatment under the following conditions:

Dispersing machine: sand grinder

Grinding medium: glass beads (diameter: 1 mm)

Packing rate of grinding medium: 50% (by volume)

Grinding time: 3 hours.

The thus-obtained dispersion was subjected to a centrifugal treatment (12,000 rpm, 20 minutes) to remove coarse particles, thereby preparing Pigment Dispersion 5.

Preparation of Ink

The following components including Pigment Dispersion 5 obtained above were mixed and filtered under pressure through a microfilter (product of Sumitomo Electric Industries, Ltd.) having a pore size of 3.0 μm, thereby preparing Cyan Ink 1.

| Pigment Dispersion 5 | 20 parts |
|---|---|
| Glycerol | 15 parts |
| Diethylene glycol | 10 parts |
| Acetylenol EH (trade name, product of Kawaken Fine Chemicals Co., Ltd.) | 0.3 parts |
| Water | 54.7 parts. |

<Preparation of Cyan Ink 2>

The following components were dissolved, and the resultant solution was then filtered under pressure through a microfilter (product of Fuji Photo Film Co., Ltd.) having a pore size of 0.2 μm, thereby preparing Cyan Ink 2.

| Exemplary Compound No. 4 (M: $NH^{4+}$) | 3 parts |
|---|---|
| Glycerol | 7 parts |
| Diethylene glycol | 5 parts |
| Urea | 5 parts |
| Ethanol | 2 parts |
| Water | 78 parts. |

<Evaluation>

Ink Evaluation Test

Evaluation tests are described below.

The color inks and liquid compositions prepared above were used in combinations shown in Tables 1 and 2 to conduct recording on recording paper. The recording was conducted by means of an ink-jet recording apparatus having the same construction as that shown in FIG. 4, and images were formed using two recording heads among the five recording heads shown in FIG. 8. At this time, the liquid composition in each ink set was first ejected to apply it to the recording paper in advance, after which the respective color inks were applied. Positions of the recording paper, to which the liquid composition was applied, were controlled so as to exactly overlap positions of the recording paper, to which the color ink was applied. Each of the recording heads used herein had a recording density of 360 dpi, and was driven under conditions of a drive frequency of 5 kHz. The ejection volume per dot of the recording heads used was 80 pl/dot for the color ink and 40 pl/dot for the liquid composition. As the recording paper, were used PB paper (trade name, product of Canon Inc.; used for both copying machines and ink-jet printers) and XEROX 4024 paper (trade name, product of Xerox Co., Ltd.).

1. Water Fastness:

Printing was conducted with the respective color inks and liquid compositions, and the resultant print samples were left to stand for 1 hour. Thereafter, the optical density of each print sample was measured by means of a Macbeth RD-915 (trade name, manufactured by Macbeth Company). The print sample was then immersed in tap water for 3 minutes, left to stand and dried to measure its optical density again, whereby the percent retention of the optical density was found in accordance with the following equation to use the value as a measure of the water fastness. The percent retention of the optical density was preferably at least 95% from the viewpoint of practical use. The evaluation results are shown in Table 1.

Percent retention of optical density (%)=[(optical density after immersion in water)/(optical density before immersion in water)]×100

A: Percent retention of optical density was not lower than 95%;

B: Percent retention of optical density was not lower than 85%, but lower than 95%;

C: Percent retention of optical density was lower than 85%.

2. Image Quality:

In a similar manner, English characters and numerals (12 point) were printed, and the resultant print sample was left to stand for 1 hour. Thereafter, the sample was visually observed to evaluate the sharpness of the characters and the degree of feathering occurred from the characters. The evaluation results are shown in Table 1.

A: Sharp in characters and free of any feathering;

B: Poor sharpness of characters and slightly caused feathering;

C: Poor sharpness of characters and considerably caused feathering.

TABLE 1

| | Combination for ink-jet recording | | 1. Water fastness | | 2. Image quality | |
|---|---|---|---|---|---|---|
| | Liquid comp. | Color ink | PB paper | XX paper | PB paper | XX paper |
| Ex. 1 | 1 | Black 1 (self-dispersing pigment) | A | A | A | A |
| Ex. 2 | 1 | Black 2 (pigment) | A | A | A | A |
| Ex. 3 | 1 | Black 3 (dye) | A | A | A | A |
| Ex. 4 | 1 | Yellow 1 (pigment) | A | A | A | A |
| Ex. 5 | 1 | Yellow 2 (dye) | A | A | A | A |
| Ex. 6 | 1 | Magenta 1 (pigment) | A | A | A | A |
| Ex. 7 | 1 | Magenta 2 (dye) | A | A | A | A |
| Ex. 8 | 1 | Cyan 1 (pigment) | A | A | A | A |
| Ex. 9 | 1 | Cyan 2 (dye) | A | A | A | A |
| Ex. 10 | 2 | Black 1 (self-dispersing pigment) | A | A | A | A |
| Ex. 11 | 2 | Black 2 (pigment) | A | A | A | A |
| Ex. 12 | 2 | Black 3 (dye) | A | A | A | A |
| Ex. 13 | 2 | Yellow 1 (pigment) | A | A | A | A |
| Ex. 14 | 2 | Yellow 2 (dye) | A | A | A | A |
| Ex. 15 | 2 | Magenta 1 (pigment) | A | A | A | A |
| Ex. 16 | 2 | Magenta 2 (dye) | A | A | A | A |
| Ex. 17 | 2 | Cyan 1 (pigment) | A | A | A | A |
| Ex. 18 | 2 | Cyan 2 (dye) | A | A | A | A |
| Ex. 19 | 3 | Black 1 (self-dispersing pigment) | A | A | A | A |
| Ex. 20 | 3 | Black 2 (pigment) | A | A | A | A |
| Ex. 21 | 3 | Black 3 (dye) | A | A | A | A |
| Ex. 22 | 3 | Yellow 1 (pigment) | A | A | A | A |
| Ex. 23 | 3 | Yellow 2 (dye) | A | A | A | A |
| Ex. 24 | 3 | Magenta 1 (pigment) | A | A | A | A |
| Ex. 25 | 3 | Magenta 2 (dye) | A | A | A | A |
| Ex. 26 | 3 | Cyan 1 (pigment) | A | A | A | A |
| Ex. 27 | 3 | Cyan 2 (dye) | A | A | A | A |
| Comp. Ex. 1 | 4 | Black 1 (self-dispersing pigment) | A | A | B | B |
| Comp. Ex. 2 | 4 | Black 2 (pigment) | A | A | B | B |
| Comp. Ex. 3 | 4 | Black 3 (dye) | C | C | C | C |
| Comp. Ex. 4 | 4 | Yellow 1 (pigment) | A | A | B | B |
| Comp. Ex. 5 | 4 | Yellow 2 (dye) | B | B | C | C |
| Comp. Ex. 6 | 4 | Magenta 1 (pigment) | A | A | B | B |
| Comp. Ex. 7 | 4 | Magenta 2 (dye) | C | C | C | C |
| Comp. Ex. 8 | 4 | Cyan 1 (pigment) | A | A | B | B |
| Comp. Ex. 9 | 4 | Cyan 2 (dye) | C | C | C | C |

3. Resistance to Bleeding:

Ink sets composed of the liquid composition and the color inks combined as shown in Table 2 were separately used to print solid print images on the above-described two plain paper sheets in the following manner. A solid print image was first printed with the black ink in each ink set. Immediately after this printing, a solid print image was printed with each of the yellow, magenta and cyan inks so as to adjoin each other. In a similar manner to the above, a solid print image was then printed with the yellow ink. Immediately after this printing, a solid print image was printed with each of the black, magenta and cyan inks so as to adjoin each other. In a similar manner to the above, a solid print image was then printed with the magenta ink. Immediately after this printing, a solid print image was printed with each of the black, yellow and cyan inks so as to adjoin each other. In a similar manner to the above, a solid print image was further printed with the cyan ink. Immediately after this printing, a solid print image was printed with each of the black, magenta and yellow inks so as to adjoin each other. Boundary portions of the solid print samples thus obtained were visually observed to evaluate the ink sets as to resistance to bleeding between the respective color inks in accordance with the following standard. The evaluation results are shown in Table 2.

A: No bleeding was observed all the boundary portions;

B: Slight bleeding was observed, but not very conspicuous;

C: Bleeding was observed to a great extent at almost all the boundary portions.

TABLE 2

| | Liquid comp. | Ink set | | | | Bleeding PB paper | XX paper |
|---|---|---|---|---|---|---|---|
| | | | Color ink | | | | |
| Ex. 28 | 1 | Black 1 (self-dispersing pigment) | Yellow 1 (pigment) | Magenta 1 (pigment) | Cyan 1 (pigment) | A | A |
| Ex. 29 | 1 | Black 3 (dye) | Yellow 2 (dye) | Magenta 2 (dye) | Cyan 2 (dye) | A | A |
| Ex. 30 | 2 | Black 1 (self-dispersing pigment) | Yellow 1 (pigment) | Magenta 1 (pigment) | Cyan 1 (pigment) | A | A |
| Ex. 31 | 2 | Black 3 (dye) | Yellow 2 (dye) | Magenta 2 (dye) | Cyan 2 (dye) | A | A |
| Ex. 32 | 3 | Black 1 (self-dispersing pigment) | Yellow 1 (pigment) | Magenta 1 (pigment) | Cyan 1 (pigment) | A | A |
| Ex. 33 | 3 | Black 3 (dye) | Yellow 2 (dye) | Magenta 2 (dye) | Cyan 2 (dye) | A | A |
| Comp. Ex. 10 | 4 | Black 1 (self-dispersing pigment) | Yellow 1 (pigment) | Magenta 1 (pigment) | Cyan 1 (pigment) | C | C |
| Comp. Ex. 11 | 4 | Black 3 (dye) | Yellow 2 (dye) | Magenta 2 (dye) | Cyan 2 (dye) | C | C |

EXAMPLES 34 TO 41

These examples are examples corresponding to the second embodiment.

A black ink and color inks of yellow, magenta and cyan were combined to prepare ink sets according to EXAMPLES 34 to 37 and COMPARATIVE EXAMPLES 12 to 15. The respective inks were prepared with the following respective components in accordance with the following respective processes. With respect to the black ink making up each ink set, Dispersion 1 or 2 of carbon black obtained above was used to mix it with its corresponding components shown below, and the resultant mixture was filtered under pressure through a microfilter (product of Sumitomo Electric Industries, Ltd.) having a pore size of 3 $\mu$m, thereby preparing the black ink. With respect to the color inks making up each ink set, the following respective components were dissolved, and the resultant solutions were then separately filtered under pressure through a microfilter (product of Fuji Photo Film Co., Ltd.) having a pore size of 0.2 $\mu$m, thereby preparing the respective color inks. Principal compositions of the ink sets according to EXAMPLES 34 to 37 and COMPARATIVE EXAMPLES 12 to 15 are shown in Table 3.

<Ink set of EXAMPLE 34>

Black ink:

| | |
|---|---|
| Pigment Dispersion 1 | 40 parts |
| Glycerol | 8 parts |
| Trimethylolpropane | 5 parts |
| Isopropyl alcohol | 4 parts |
| Water | 43 parts. |

Yellow ink:

| | |
|---|---|
| C.I. Acid Yellow 23 | 2.5 parts |
| Glycerol | 5 parts |
| Diethylene glycol | 5 parts |
| Acetylenol EH (trade name, product of Kawaken Fine Chemicals Co., Ltd.) | 1 part |
| Magnesium gluconate | 2 parts |
| Water | 84.5 parts. |

Magenta ink:

| | |
|---|---|
| C.I. Acid Red 289 | 2 parts |
| Glycerol | 8 parts |
| Diethylene glycol | 5 parts |
| Acetylenol EH (trade name, product of Kawaken Fine Chemicals Co., Ltd.) | 1 part |
| Magnesium gluconate | 2 parts |
| Water | 82 parts. |

Cyan ink:

| | |
|---|---|
| C.I. Acid Blue 9 | 2 parts |
| Glycerol | 8 parts |
| Diethylene glycol | 5 parts |
| Acetylenol EH (trade name, product of Kawaken Fine Chemicals Co., Ltd.) | 1 part |
| Calcium gluconate | 1 part |
| Water | 83 parts. |

<Ink set of EXAMPLE 35>

Black ink:

| | |
|---|---|
| Pigment Dispersion 1 | 40 parts |
| Glycerol | 5 parts |
| Diethylene glycol | 5 parts |
| 2-Pyrrolidone | 5 parts |
| Acetylenol EH (trade name, product of Kawaken Fine Chemicals Co., Ltd.) | 0.3 parts |
| Water | 44.7 parts. |

Yellow ink:

| | |
|---|---|
| C.I. Acid Yellow 23 | 2.5 parts |
| Glycerol | 5 parts |
| Triethylene glycol monobutyl ether | 10 parts |
| Calcium gluconate | 2 parts |
| Water | 80.5 parts. |

Magenta ink:

| | |
|---|---|
| C.I. Acid Red 289 | 2 parts |
| Glycerol | 8 parts |

-continued

| | |
|---|---|
| Thiodiglycol | 5 parts |
| Triethylene glycol monobutyl ether | 10 parts |
| Calcium gluconate | 1.5 parts |
| Water | 73.5 parts. |

Cyan ink:

| | |
|---|---|
| C.I. Acid Blue 9 | 2 parts |
| Diethylene glycol | 5 parts |
| Trimethylolpropane | 5 parts |
| Triethylene glycol monobutyl ether | 10 parts |
| Calcium DL-glycerate | 1 part |
| Water | 77 parts. |

<Ink set of EXAMPLE 36>

Black ink:

| | |
|---|---|
| Pigment Dispersion 2 | 20 parts |
| Trimethylolpropane | 5 parts |
| Diethylene glycol | 10 parts |
| 2-Pyrrolidone | 5 parts |
| Acetylenol EH (trade name, product of Kawaken Fine Chemicals Co., Ltd.) | 0.2 parts |
| Water | 59.8 parts. |

Yellow ink:

| | |
|---|---|
| C.I. Acid Yellow 23 | 2.5 parts |
| Glycerol | 5 parts |
| Diethylene glycol | 5 parts |
| Trimethylolpropane | 5 parts |
| Acetylenol EH (trade name, product of Kawaken Fine Chemicals Co., Ltd.) | 1 part |
| Magnesium gluconate | 2 parts |
| Water | 79.5 parts. |

Magenta ink:

| | |
|---|---|
| C.I. Acid Red 289 | 2 parts |
| Glycerol | 8 parts |
| Diethylene glycol | 5 parts |
| Thiodiglycol | 5 parts |
| Acetylenol EH (trade name, product of Kawaken Fine Chemicals Co., Ltd.) | 1 part |
| Magnesium gluconate | 1.5 parts |
| Water | 77.5 parts. |

Cyan ink:

| | |
|---|---|
| C.I. Acid Blue 9 | 2 parts |
| Ethylene glycol | 8 parts |
| Diethylene glycol | 5 parts |
| Trimethylolpropane | 5 parts |
| Acetylenol EH (trade name, product of Kawaken Fine Chemicals Co., Ltd.) | 1 part |
| Magnesium gluconate | 1 part |
| Water | 78 parts. |

<Ink set of EXAMPLE 37>

Black ink:

| | |
|---|---|
| Exemplary Compound No. 5 (M: $NH^{4+}$) | 2 parts |
| Glycerol | 8 parts |
| Trimethylolpropane | 1 parts |
| Isopropyl alcohol | 4 parts |
| Sodium hydroxide | 0.2 parts |
| Water | 80.8 parts. |

Yellow ink:

| | |
|---|---|
| C.I. Acid Yellow 23 | 2.5 parts |
| Glycerol | 5 parts |
| Diethylene glycol | 5 parts |
| Acetylenol EH (trade name, product of Kawaken Fine Chemicals Co., Ltd.) | 1 part |
| Calcium gluconate | 2 parts |
| Water | 84.5 parts. |

Magenta ink:

| | |
|---|---|
| C.I. Acid Red 289 | 2 parts |
| Glycerol | 8 parts |
| Diethylene glycol | 5 parts |
| Acetylenol EH (trade name, product of Kawaken Fine Chemicals Co., Ltd.) | 1 part |

-continued

| | |
|---|---|
| Calcium DL-glycerate | 1 part |
| Water | 83 parts. |

Cyan ink:

| | |
|---|---|
| C.I. Direct Blue 199 | 2 parts |
| Glycerol | 8 parts |
| Diethylene glycol | 5 parts |
| Acetylenol EH (trade name, product of Kawaken Fine Chemicals Co., Ltd.) | 1 part |
| Magnesium gluconate | 2 parts |
| Water | 82 parts. |

<Ink set of COMPARATIVE EXAMPLE 12>

Black ink:

| | |
|---|---|
| Pigment Dispersion 1 | 40 parts |
| Glycerol | 8 parts |
| Trimethylolpropane | 5 parts |
| Isopropyl alcohol | 4 parts |
| Water | 43 parts. |

Yellow ink:

| | |
|---|---|
| C.I. Acid Yellow 23 | 2.5 parts |
| Glycerol | 5 parts |
| Diethylene glycol | 5 parts |
| Acetylenol EH (trade name, product of Kawaken Fine Chemicals Co., Ltd.) | 1 part |
| Water | 86.5 parts. |

Magenta ink:

| | |
|---|---|
| C.I. Acid Red 289 | 2 parts |
| Glycerol | 8 parts |
| Diethylene glycol | 5 parts |
| Acetylenol EH (trade name, product of Kawaken Fine Chemicals Co., Ltd.) | 1 part |
| Water | 84 parts. |

Cyan ink:

| | |
|---|---|
| C.I. Acid Blue 9 | 2 parts |
| Glycerol | 8 parts |
| Diethylene glycol | 5 parts |
| Acetylenol EH (trade name, product of Kawaken Fine Chemicals Co., Ltd.) | 1 part |
| Water | 84 parts. |

<Ink set of COMPARATIVE EXAMPLE 13>

Black ink:

| | |
|---|---|
| Pigment Dispersion 1 | 40 parts |
| Glycerol | 5 parts |
| Diethylene glycol | 5 parts |
| 2-Pyrrolidone | 5 parts |
| Acetylenol EH (trade name, product of Kawaken Fine Chemicals Co., Ltd.) | 0.3 parts |
| Water | 44.7 parts. |

Yellow ink:

| | |
|---|---|
| C.I. Acid Yellow 23 | 2.5 parts |
| Glycerol | 5 parts |
| Triethylene glycol monobutyl ether | 10 parts |
| Water | 82.5 parts. |

Magenta ink:

| | |
|---|---|
| C.I. Acid Red 289 | 2 parts |
| Glycerol | 8 parts |
| Thiodiglycol | 5 parts |
| Triethylene glycol monobutyl ether | 10 parts |
| Water | 75 parts. |

Cyan ink:

| | |
|---|---|
| C.I. Acid Blue 9 | 2 parts |
| Diethylene glycol | 5 parts |
| Trimethylolpropane | 5 parts |
| Triethylene glycol monobutyl ether | 10 parts |
| Water | 78 parts. |

<Ink set of COMPARATIVE EXAMPLE 14>

Black ink:

-continued

| | |
|---|---|
| Pigment Dispersion 2 | 20 parts |
| Trimethylolpropane | 5 parts |
| Diethylene glycol | 10 parts |
| 2-Pyrrolidone | 5 parts |
| Acetylenol EH (trade name, product of Kawaken Fine Chemicals Co., Ltd.) | 0.2 parts |
| Water | 59.8 parts. |

Yellow ink:

| | |
|---|---|
| C.I. Acid Yellow 23 | 2.5 parts |
| Glycerol | 5 parts |
| Diethylene glycol | 5 parts |
| Trimethylolpropane | 5 parts |
| Acetylenol EH (trade name, product of Kawaken Fine Chemicals Co., Ltd.) | 1 part |
| Water | 81.5 parts. |

Magenta ink:

| | |
|---|---|
| C.I. Acid Red 289 | 2 parts |
| Glycerol | 8 parts |
| Diethylene glycol | 5 parts |
| Thiodiglycol | 5 parts |
| Acetylenol EH (trade name, product of Kawaken Fine Chemicals Co., Ltd.) | 1 part |
| Water | 79 parts. |

Cyan ink:

| | |
|---|---|
| C.I. Acid Blue 9 | 2 parts |
| Ethylene glycol | 8 parts |
| Diethylene glycol | 5 parts |
| Trimethylolpropane | 5 parts |
| Acetylenol EH (trade name, product of Kawaken Fine Chemicals Co., Ltd.) | 1 part |
| Water | 79 parts. |

<Ink set of COMPARATIVE EXAMPLE 15>

Black ink:

| | |
|---|---|
| Exemplary Compound No. 1 (M: NH$^{4+}$) | 2 parts |
| Glycerol | 8 parts |
| Trimethylolpropane | 5 parts |
| Isopropyl alcohol | 4 parts |
| Water | 81 parts. |

Yellow ink:

| | |
|---|---|
| C.I. Acid Yellow 23 | 2.5 parts |
| Glycerol | 5 parts |
| Diethylene glycol | 5 parts |
| Acetylenol EH (trade name, product of Kawaken Fine Chemicals Co., Ltd.) | 1 part |
| Water | 86.5 parts. |

Magenta ink:

| | |
|---|---|
| C.I. Acid Red 289 | 2 parts |
| Glycerol | 8 parts |
| Diethylene glycol | 5 parts |
| Acetylenol EH (trade name, product of Kawaken Fine Chemicals Co., Ltd.) | 1 part |
| Water | 84 parts. |

Cyan ink:

| | |
|---|---|
| C.I. Direct Blue 199 | 2 parts |
| Glycerol | 8 parts |
| Diethylene glycol | 5 parts |
| Acetylenol EH (trade name, product of Kawaken Fine Chemicals Co., Ltd.) | 1 part |
| Water | 84 parts. |

TABLE 3

| | | Coloring material | Polyvalent metal salt of aldonic acid |
|---|---|---|---|
| Ex. 34 | Bk | Pigment Dispersion 1 | — |
| | Y | Acid Y-23 | Mg gluconate |
| | M | Acid R-289 | Mg gluconate |
| | C | Acid B-9 | Ca gluconate |
| Ex. 35 | Bk | Pigment Dispersion 1 | — |
| | Y | Acid Y-23 | Ca gluconate |
| | M | Acid R-289 | Ca gluconate |
| | C | Acid B-9 | Ca DL-glycerate |
| Ex. 36 | Bk | Pigment Dispersion 2 | — |
| | Y | Acid Y-23 | Mg gluconate |
| | M | Acid R-289 | Mg gluconate |
| | C | Acid B-9 | Mg gluconate |
| Ex. 37 | Bk | Exemplary Compound 1 | — |
| | Y | Acid Y-23 | Ca gluconate |
| | M | Acid R-289 | Ca DL-glycerate |
| | C | Acid B-199 | Mg gluconate |
| Comp. Ex. 12 | Bk | Pigment Dispersion 1 | — |
| | Y | Acid Y-23 | — |
| | M | Acid R-289 | — |
| | C | Acid B-9 | — |
| Comp. Ex. 13 | Bk | Pigment Dispersion 1 | — |
| | Y | Acid Y-23 | — |
| | M | Acid R-289 | — |
| | C | Acid B-9 | — |
| Comp. Ex. 14 | Bk | Pigment Dispersion 2 | — |
| | Y | Acid Y-23 | — |
| | M | Acid R-289 | — |
| | C | Acid B-9 | — |
| Comp. Ex. 15 | Bk | Exemplary Compound 1 | — |
| | Y | Acid Y-23 | — |
| | M | Acid R-289 | — |
| | C | Acid B-199 | — |

[Evaluation Method and Evaluation Standard]

Each of the ink sets obtained in EXAMPLES 34 to 37 and COMPARATIVE EXAMPLES 12 to 15 was charged into a color ink-jet printer (BJC-700J, trade name, manufactured by Canon Inc.) which is an ink-jet recording apparatus having an On-Demand type multi-recording head which ejects an ink by applying thermal energy in response to recording signals to the ink, thereby evaluating each ink set as to the following items (1) and (2). As paper for evaluation, were used PB paper (trade name, product of Canon Inc.; used for both copying machines and ink-jet printers) and XEROX 4024 paper (trade name, product of Xerox Co., Ltd.). The results are shown in Table 4.

(1) Bleeding Between Black Ink and Color Ink:

A solid print image was printed with the black ink in each ink set on the above-described two plain paper sheets. Immediately after this printing, a solid print image was printed with each of the yellow, magenta and cyan inks so as to adjoin each other. Boundary portions of the solid print samples thus obtained were visually observed to evaluate the ink set as to resistance to bleeding between the black ink and the color inks in accordance with the following standard.

A: No bleeding was observed all the boundary portions;
B: Slight bleeding was observed;
C: Bleeding was observed to a great extent at almost all the boundary portions.

(2) Density of Black Ink Portion in Boundary Portions Between Black Ink and Color Ink:

A solid print image was printed with the black ink in each ink set on the above-described two plain paper sheets. Immediately after this printing, a solid print image was printed with each of the yellow, magenta and cyan inks so as to adjoin each other to visually observe whether whitish haze occurred at boundary portions therebetween or not, thereby evaluating the ink set in accordance with the following standard.

A: No decrease in density was observed at the black ink portions in the boundary portions, and so no whitish haze occurred;

B: Density of the black ink portions in the boundary portions was decreased, and occurrence of whitish haze was observed, but no problem was offered from the viewpoint of practical use;

C: Density of the black ink portions in the boundary portions was considerably decreased, and occurrence of whitish haze was markedly observed.

EXAMPLES 38 TO 41 AND COMPARATIVE EXAMPLES 16 TO 19

Each of the ink sets obtained in EXAMPLES 34 to 37 and COMPARATIVE EXAMPLES 12 to 15 was used to form an image by the first method in which a black ink and a color ink are applied to the same position on a recording medium, and the application of the color ink is conducted prior to the application of the black ink. The ink-jet recording processes by the first method respectively using the ink sets according to EXAMPLES 34 to 37 were regarded as EXAMPLES 38 to 41, and the ink-jet recording processes by the first method respectively using the ink sets according to COMPARATIVE EXAMPLES 12 to 15 were regarded as COMPARATIVE EXAMPLES 16 to 19. The quantitative ratio of the black ink to the color ink per unit area of the recording medium in EXAMPLES 38 to 41 and COMPARATIVE EXAMPLES 16 to 19 was controlled to 10:2.5. The evaluation results are shown in Table 4.

TABLE 4

| First method | | (1) Bleeding between Bk ink and color | | (2) Whitish haze between Bk ink and color ink | |
|---|---|---|---|---|---|
| | | PB paper | XX paper | PB paper | XX paper |
| Ex. 34 | Not conducted | A | A | B | B |
| Ex. 35 | Not conducted | A | A | A | B |
| Ex. 36 | Not conducted | A | A | A | B |
| Ex. 37 | Not conducted | A | A | A | B |
| Ex. 38 | Conducted | A | A | A | A |
| Ex. 39 | Conducted | A | A | A | A |
| Ex. 40 | Conducted | A | A | A | A |
| Ex. 41 | Conducted | A | A | A | A |
| Comp. Ex. 12 | Not conducted | C | C | C | C |
| Comp. Ex. 13 | Not conducted | C | C | C | C |
| Comp. Ex. 14 | Not conducted | C | C | C | C |
| Comp. Ex. 15 | Not conducted | C | C | C | C |
| Comp. Ex. 16 | Conducted | C | C | B | B |
| Comp. Ex. 17 | Conducted | C | C | B | B |
| Comp. Ex. 18 | Conducted | C | C | B | B |
| Comp. Ex. 19 | Conducted | C | C | B | B |

As described above, according to the present invention, there can be provided liquid compositions, ink sets for ink-jet recording, ink-jet recording processes, recording units and ink-jet recording apparatus for providing high-quality images with lessened bleeding. There can be also provided liquid compositions, ink sets for ink-jet recording, ink-jet recording processes, recording units and ink-jet recording apparatus for providing images excellent in water fastness.

What is claimed is:

1. A liquid composition for an ink jet recording which is used together with a color ink and reacts with the color ink when it comes into contact with the color ink, comprising a polyvalent metal salt of aldonic acid and a liquid medium.

2. The liquid composition according to claim 1, wherein the polyvalent metal salt of aldonic acid is at least one selected from the group consisting of magnesium gluconate, calcium gluconate, barium gluconate, iron(II) gluconate, copper(II) gluconate and zinc gluconate.

3. The liquid composition according to claim 1, wherein the total content of the polyvalent metal salt of aldonic acid is 0.005 to 20% by mass based on the total amount of the liquid composition.

4. An ink-jet recording process, comprising the steps of:
 (i) applying energy to the liquid composition according to any one of claims 1 to 3 to eject it toward a recording medium;
 (ii) applying energy to a color ink to eject it toward a recording medium; and
 (iii) forming a contact state of the liquid composition with the color ink on the recording medium.

5. The ink-jet recording process according to claim 4, wherein a coloring material of the color ink is a pigment.

6. The ink-jet recording process according to claim 4, wherein a coloring material of the color ink is a dye having at least one carboxyl group.

7. The ink-jet recording process according to claim 4, wherein the energy is thermal energy.

8. The ink-jet recording process according to claim 4, wherein the energy is mechanical energy by deformation of a piezoelectric element.

9. The ink-jet recording process according to claim 4, wherein the step (i) is conducted prior to the step (ii).

10. The ink-jet recording process according to claim 4, wherein the step (i) is conducted after the step (ii).

11. The ink-jet recording process according to claim 4, wherein the step (ii) is conducted twice, and the step (i) is conducted between the step (ii).

12. The ink-jet recording process according to claim 4, wherein the step (i) is conducted twice, and the step (ii) is conducted between the step (i).

13. The ink-jet recording process according to claim 4, wherein the liquid composition and the color ink are mixed with each other just after their ejection from an ink-jet recording apparatus to the recording medium.

14. An ink set for ink-jet recording, comprising
 (1) the liquid composition according to any one of claims 1 to 3, and
 (2) a color ink which comprises a coloring material and a liquid medium and reacts with the liquid composition by contact with the liquid composition.

15. An ink-jet recording unit, comprising a liquid composition container portion containing the liquid composition according to any one of claims 1 to 3, an ink container portion containing a color ink, and an ink-jet recording head for ejecting the liquid composition and the color ink by applying energy to the liquid composition and the color ink.

16. The ink-jet recording unit according to claim 15, wherein the energy is thermal energy.

17. The ink-jet recording unit according to claim 15, wherein the energy is mechanical energy by deformation of a piezoelectric element.

18. An ink-jet recording apparatus comprising a recording unit according to claim 15.

19. An ink-jet recording apparatus, comprising a liquid composition container portion containing a liquid composition, an ink container portion containing a color ink, and an ink-jet recording head for ejecting the liquid composition and the color ink by applying energy to the liquid composition and the color ink, wherein the liquid composition is the liquid composition according to any one of claims 1 to 3.

20. An ink set for ink-jet recording, comprising
   (1) a color ink comprising a coloring material, a liquid medium and a polyvalent metal salt of aldonic acid, and
   (2) a black ink which comprises a coloring material and a liquid medium and reacts with the color ink by contact with the color ink.

21. The ink set for ink-jet recording according to claim 20, wherein the polyvalent metal salt of aldonic acid is at least one selected from the group consisting of magnesium gluconate, calcium gluconate, barium gluconate, iron(II) gluconate, copper(II) gluconate and zinc gluconate.

22. The ink set for ink-jet recording according to claim 20, wherein the total content of the polyvalent metal salt of aldonic acid is 0.005 to 20% by mass based on the total amount of the ink.

23. The ink set for ink-jet recording according to claim 20, wherein a coloring material of the black ink is a pigment.

24. The ink set for ink-jet recording according to claim 20, wherein a coloring material of the black ink is a dye having at least one carboxyl group.

25. The ink set for ink-jet recording according to claim 20, wherein contents of water in the black ink and the color ink are each 35 to 96% by mass based on the total amount of each ink.

26. The ink set for ink-jet recording according to claim 20, wherein the color ink is at least one ink selected from the group consisting of an yellow ink, a magenta ink and a cyan ink.

27. An ink-jet recording process, comprising the steps of:

(i) applying energy to the black ink contained in the ink set according to any one of claims 20 to 26 to eject it toward a recording medium;

(ii) applying energy to the color ink contained in the ink set according to any one of claims 20 to 26 to eject it toward a recording medium; and (iii) forming a contact state of the black ink with the color ink on the recording medium.

28. The ink-jet recording process according to claim 27, wherein the black ink and the color ink are applied to the recording medium so as to overlap each other on the recording medium, and step (ii) is conducted prior to the step (i).

29. The ink-jet recording process according to claim 27, wherein the energy is thermal energy.

30. The ink-jet recording process according to claim 27, wherein the energy is mechanical energy by deformation of a piezoelectric element.

31. An ink-jet recording unit, comprising an ink container portion containing the ink set according to any one of claims 20 to 26 and an ink-jet recording head for ejecting the inks being fed from the ink container portion by applying energy to the inks.

32. The ink-jet recording unit according to claim 31, wherein the energy is thermal energy.

33. The ink-jet recording unit according to claim 31, wherein the energy is mechanical energy by deformation of a piezoelectric element.

34. An ink-jet recording apparatus comprising a recording unit according to claim 31.

35. An ink-jet recording apparatus, comprising an ink container portion containing an ink set comprising a black ink and a color ink, and an ink-jet recording head for ejecting the ink being fed from the ink container portion by applying energy to the ink, wherein the ink set is the ink set according to any one of claims 20 to 26.

* * * * *

UNITED STATES PATENT AND TRADEMARK OFFICE
CERTIFICATE OF CORRECTION

PATENT NO. : 6,550,903 B2
DATED : April 22, 2003
INVENTOR(S) : Ryuji Katsuragi et al.

It is certified that error appears in the above-identified patent and that said Letters Patent is hereby corrected as shown below:

<u>Column 1,</u>
Line 26, "have" should read -- has --.

<u>Column 6,</u>
Line 36, "use" should read -- used --.

<u>Column 18,</u>
Line 31, "material" should read -- materials --.

<u>Column 31,</u>
Line 49, "No. 5" should read -- No. 1 --.

<u>Column 37,</u>
Line 11, "comprising" should read -- comprising: --.
Line 37, "an" should read -- a --.

Signed and Sealed this

Twenty-seventh Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO.     : 6,550,903 B2
DATED          : April 22, 2003
INVENTOR(S)    : Ryuji Katsuragi et al.

It is certified that error appears in the above-identified patent and that said Letters Patent is hereby corrected as shown below:

Columns 9-10,
Compound 8 should read as follows and Exemplary Compounds 9-30 should be inserted:

Exemplary Compound 8:

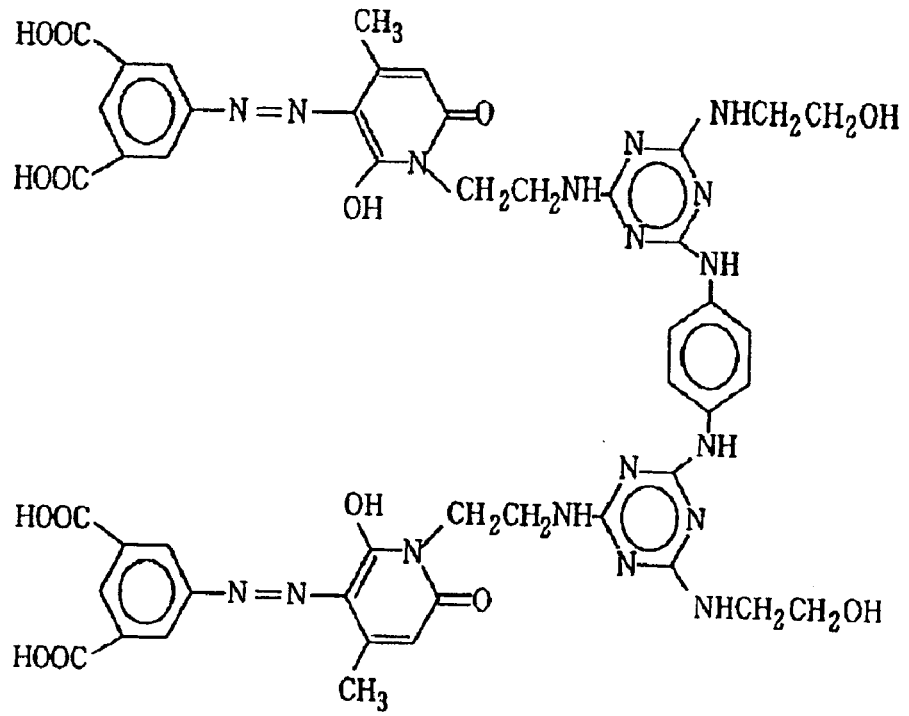

UNITED STATES PATENT AND TRADEMARK OFFICE
CERTIFICATE OF CORRECTION

PATENT NO. : 6,550,903 B2
DATED : April 22, 2003
INVENTOR(S) : Ryuji Katsuragi et al.

It is certified that error appears in the above-identified patent and that said Letters Patent is hereby corrected as shown below:

Columns 9-10 (cont'd),

Exemplary Compound 9:

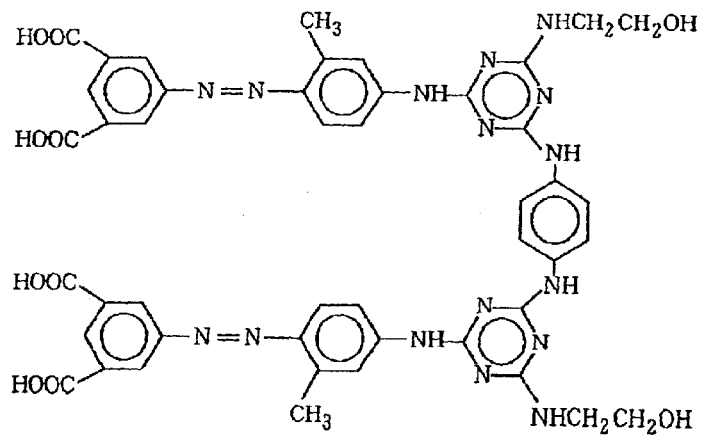

Exemplary Compound 10:

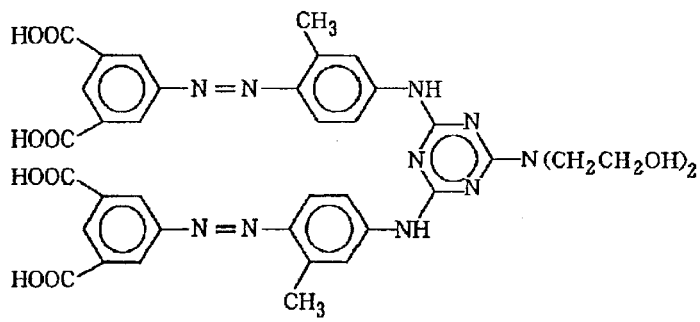

UNITED STATES PATENT AND TRADEMARK OFFICE
CERTIFICATE OF CORRECTION

PATENT NO. : 6,550,903 B2
DATED : April 22, 2003
INVENTOR(S) : Ryuji Katsuragi et al.

It is certified that error appears in the above-identified patent and that said Letters Patent is hereby corrected as shown below:

Columns 9-10 (cont'd),

Exemplary Compound 11:

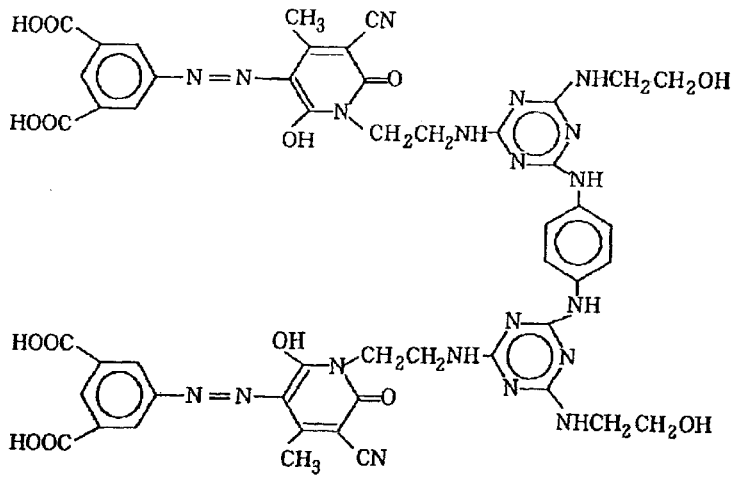

Exemplary Compound 12:

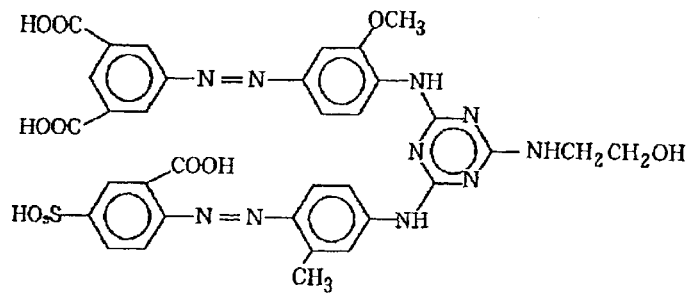

Exemplary Compound 13:

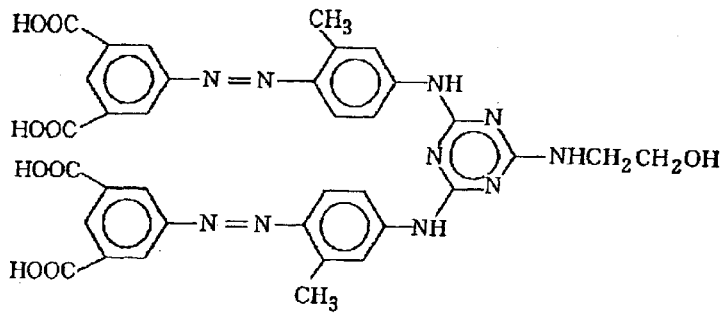

UNITED STATES PATENT AND TRADEMARK OFFICE
CERTIFICATE OF CORRECTION

PATENT NO. : 6,550,903 B2
DATED : April 22, 2003
INVENTOR(S) : Ryuji Katsuragi et al.

It is certified that error appears in the above-identified patent and that said Letters Patent is hereby corrected as shown below:

Columns 9-10 (cont'd),

Exemplary Compound 14:

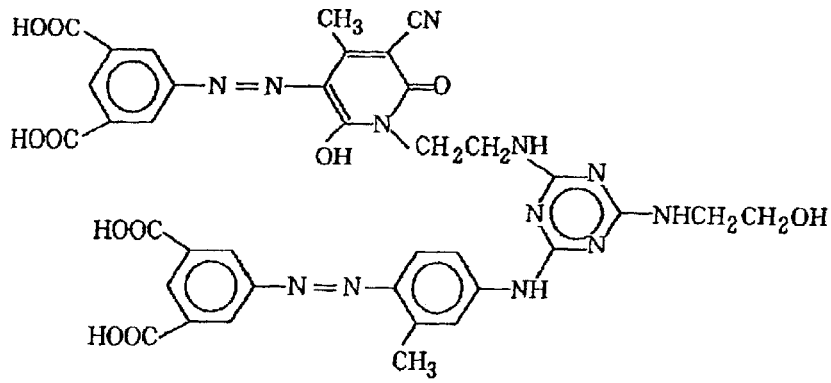

Exemplary Compound 15:

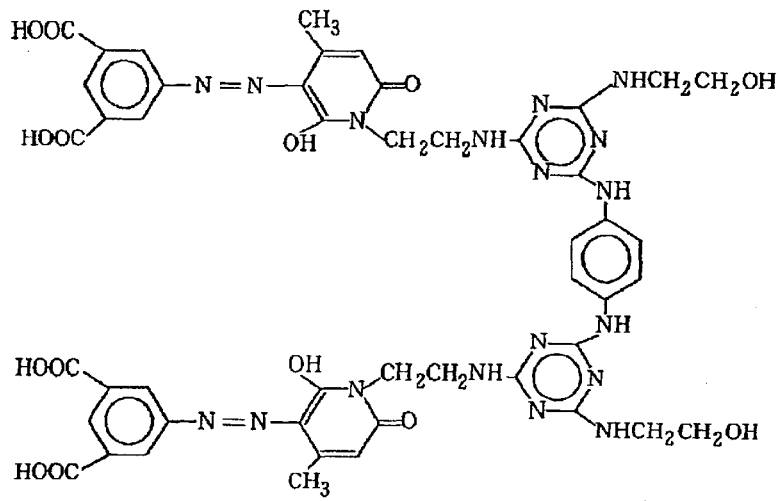

UNITED STATES PATENT AND TRADEMARK OFFICE
CERTIFICATE OF CORRECTION

PATENT NO. : 6,550,903 B2 Page 5 of 11
DATED : April 22, 2003
INVENTOR(S) : Ryuji Katsuragi et al.

It is certified that error appears in the above-identified patent and that said Letters Patent is hereby corrected as shown below:

Columns 9-10 (cont'd),

Exemplary Compound 16:

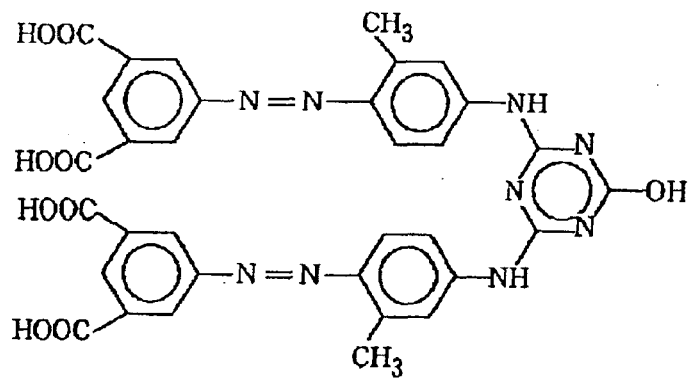

Exemplary Compound 17:

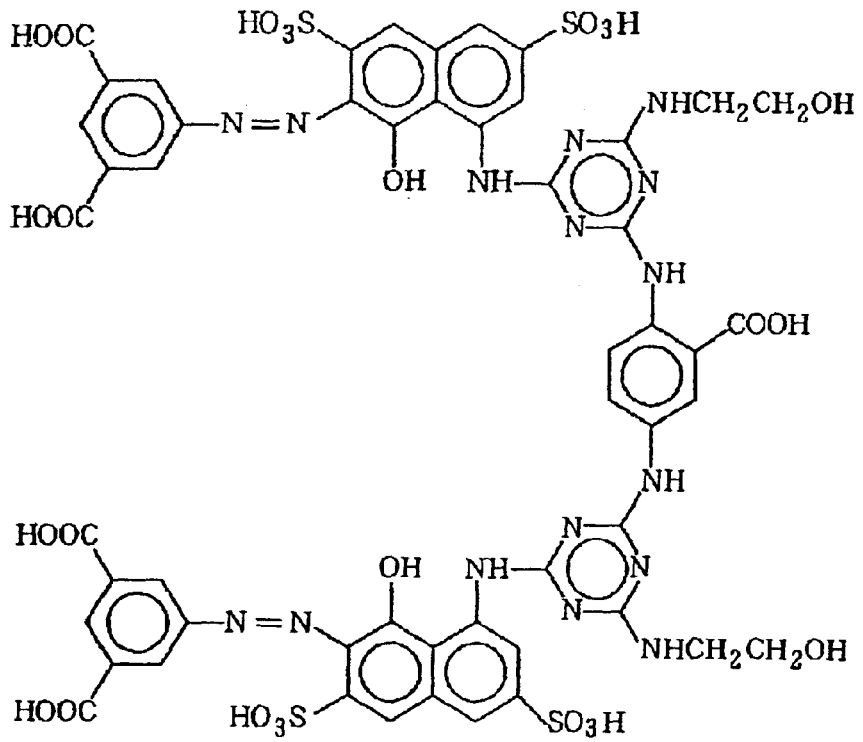

UNITED STATES PATENT AND TRADEMARK OFFICE
CERTIFICATE OF CORRECTION

PATENT NO. : 6,550,903 B2  
DATED : April 22, 2003  
INVENTOR(S) : Ryuji Katsuragi et al.

It is certified that error appears in the above-identified patent and that said Letters Patent is hereby corrected as shown below:

Columns 9-10 (cont'd),

Exemplary Compound 18:

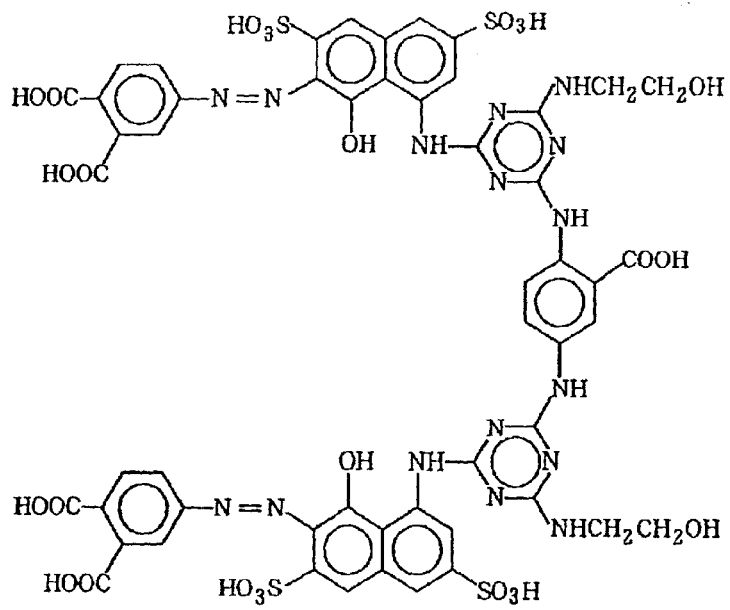

Exemplary Compound 19:

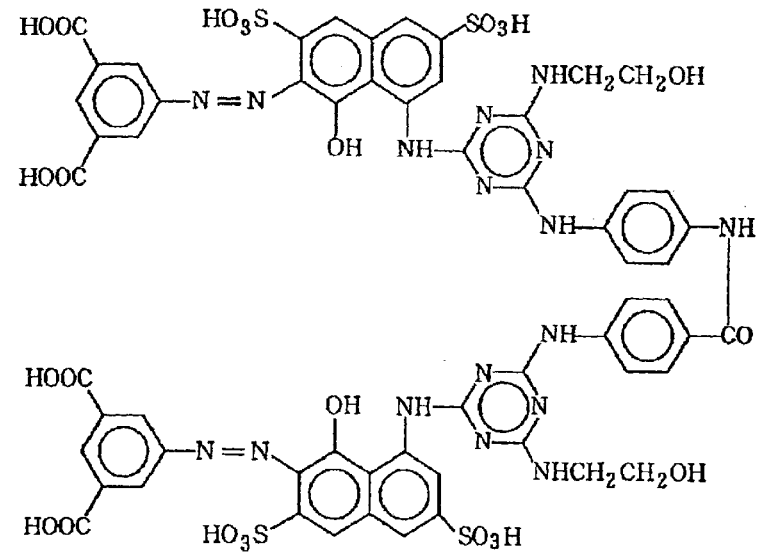

UNITED STATES PATENT AND TRADEMARK OFFICE
CERTIFICATE OF CORRECTION

PATENT NO. : 6,550,903 B2
DATED : April 22, 2003
INVENTOR(S) : Ryuji Katsuragi et al.

Page 7 of 11

It is certified that error appears in the above-identified patent and that said Letters Patent is hereby corrected as shown below:

Columns 9-10 (cont'd),

Exemplary Compound 20:

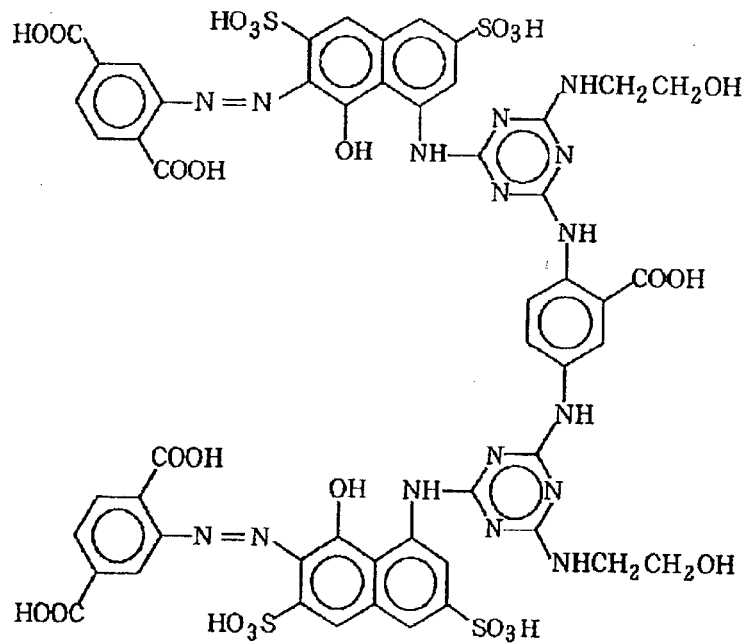

Exemplary Compound 21:

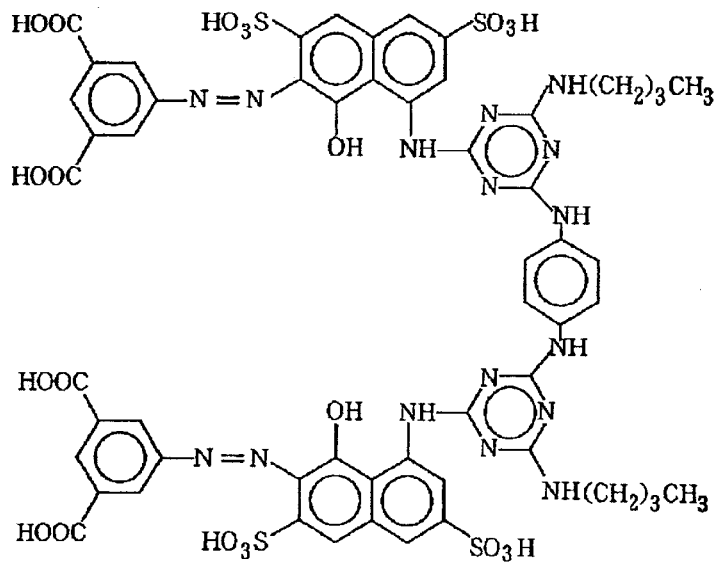

UNITED STATES PATENT AND TRADEMARK OFFICE
CERTIFICATE OF CORRECTION

PATENT NO.    : 6,550,903 B2                                              Page 8 of 11
DATED         : April 22, 2003
INVENTOR(S)   : Ryuji Katsuragi et al.

It is certified that error appears in the above-identified patent and that said Letters Patent is hereby corrected as shown below:

Columns 9-10 (cont'd),

Exemplary Compound 22:

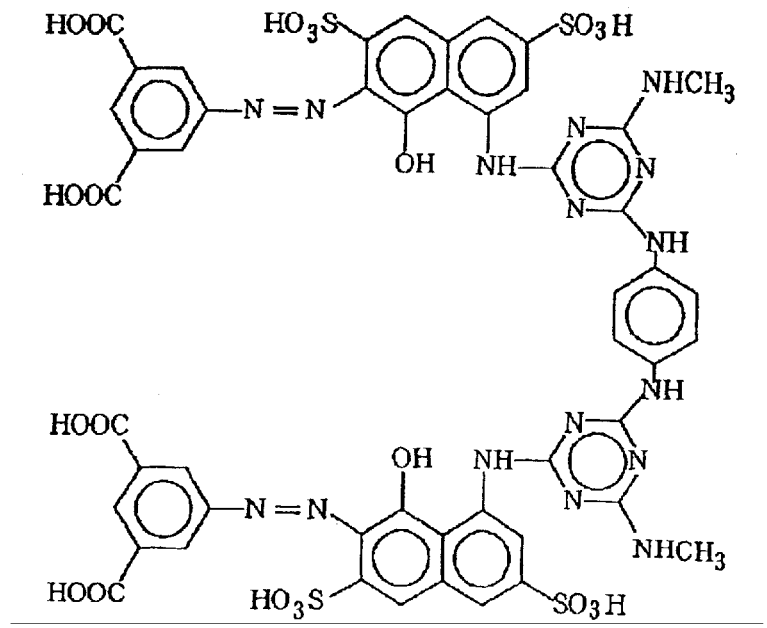

Exemplary Compound 23:

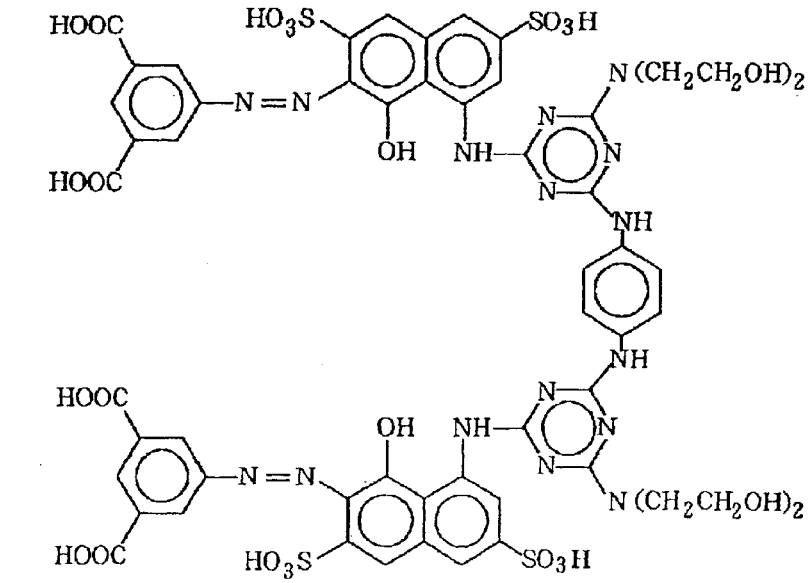

UNITED STATES PATENT AND TRADEMARK OFFICE
CERTIFICATE OF CORRECTION

PATENT NO. : 6,550,903 B2
DATED : April 22, 2003
INVENTOR(S) : Ryuji Katsuragi et al.

It is certified that error appears in the above-identified patent and that said Letters Patent is hereby corrected as shown below:

Columns 9-10 (cont'd),

Exemplary Compound 24:

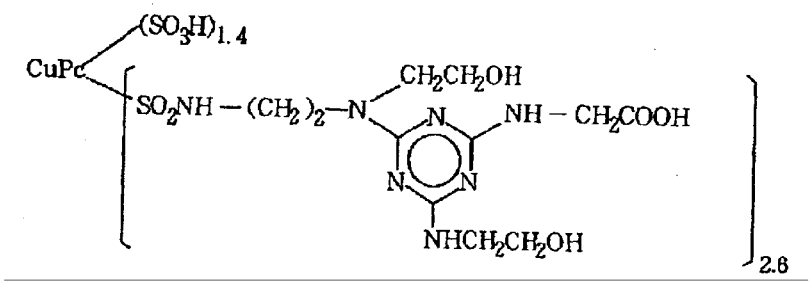

Exemplary Compound 25:

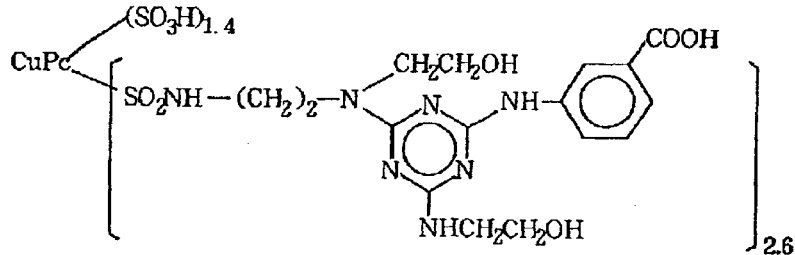

Exemplary Compound 26:

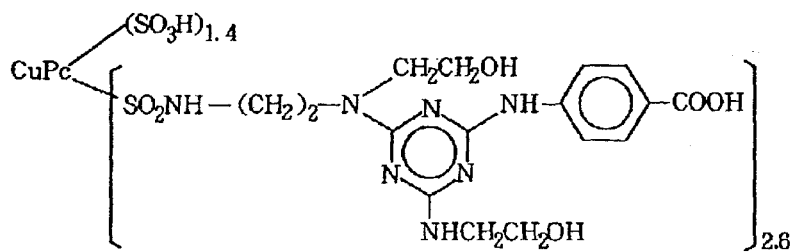

UNITED STATES PATENT AND TRADEMARK OFFICE
CERTIFICATE OF CORRECTION

PATENT NO. : 6,550,903 B2
DATED : April 22, 2003
INVENTOR(S) : Ryuji Katsuragi et al.

It is certified that error appears in the above-identified patent and that said Letters Patent is hereby corrected as shown below:

Columns 9-10 (cont'd),

Exemplary Compound 27:

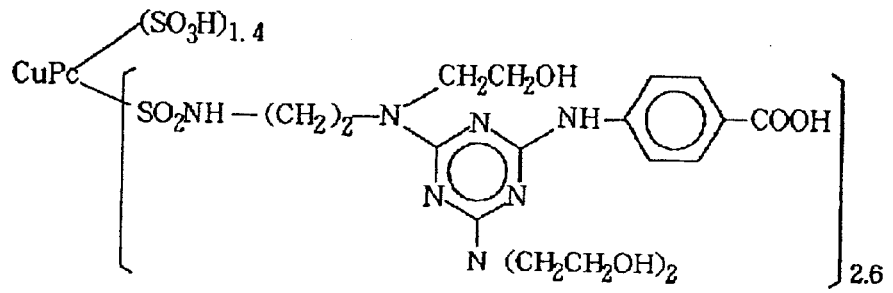

Exemplary Compound 28:

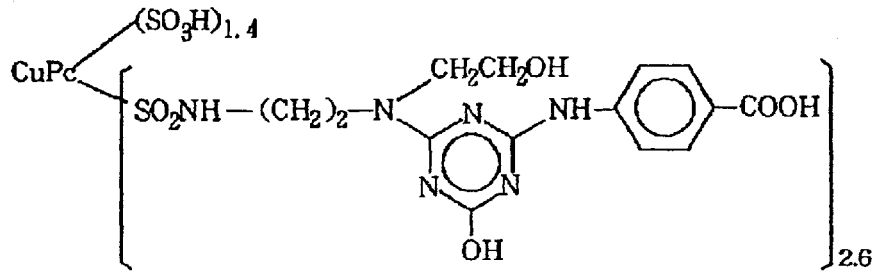

Exemplary Compound 29:

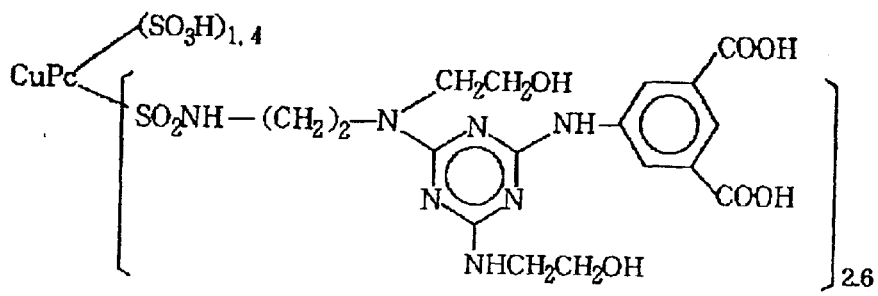

UNITED STATES PATENT AND TRADEMARK OFFICE
CERTIFICATE OF CORRECTION

PATENT NO.   : 6,550,903 B2
DATED        : April 22, 2003
INVENTOR(S)  : Ryuji Katsuragi et al.

It is certified that error appears in the above-identified patent and that said Letters Patent is hereby corrected as shown below:

Columns 9-10 (cont'd),

Exemplary Compound 30:

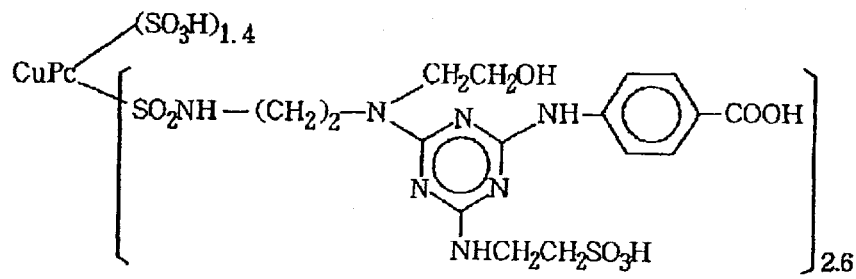

Signed and Sealed this

Seventeenth Day of August, 2004

JON W. DUDAS
*Acting Director of the United States Patent and Trademark Office*